(12) United States Patent
Kikuchi

(10) Patent No.: US 9,280,298 B2
(45) Date of Patent: Mar. 8, 2016

(54) STORAGE DEVICE AND STORAGE SYSTEM

(71) Applicant: KABUSHIKI KAISHA TOSHIBA, Minato-ku (JP)

(72) Inventor: Takeshi Kikuchi, Sagamihara (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 326 days.

(21) Appl. No.: 13/926,242

(22) Filed: Jun. 25, 2013

(65) Prior Publication Data
US 2014/0281282 A1    Sep. 18, 2014

Related U.S. Application Data

(60) Provisional application No. 61/788,309, filed on Mar. 15, 2013.

(51) Int. Cl.
*G06F 3/06* (2006.01)
(52) U.S. Cl.
CPC ..................................... *G06F 3/067* (2013.01)
(58) Field of Classification Search
None
See application file for complete search history.

(56) References Cited

U.S. PATENT DOCUMENTS

| | | | |
|---|---|---|---|
| 5,892,979 A | 4/1999 | Shiraki | |
| 5,970,229 A * | 10/1999 | Thomas et al. | 709/212 |
| 6,868,461 B1 * | 3/2005 | Mirkhani et al. | 710/56 |
| 2003/0200477 A1 * | 10/2003 | Ayres | 714/2 |
| 2006/0047908 A1 * | 3/2006 | Chikusa et al. | 711/114 |
| 2012/0030385 A1 | 2/2012 | Yoshimura | |
| 2012/0151101 A1 | 6/2012 | Matsuo et al. | |

FOREIGN PATENT DOCUMENTS

| | | |
|---|---|---|
| JP | 8-36877 | 2/1996 |
| JP | 2012-32962 | 2/2012 |
| JP | 2012-128560 | 7/2012 |

* cited by examiner

*Primary Examiner* — Gary Portka
(74) *Attorney, Agent, or Firm* — Oblon, McClelland, Maier & Neustadt, L.L.P.

(57) ABSTRACT

According to one embodiment, a storage device includes a first memory, an interface that includes first physical layers and connects a host and the first memory, a second memory that temporarily stores the data transferred between the host and the first memory, a controller that controls operation of the interface. When the data is transferred from the first memory to the host, the controller reads the data corresponding to the data transfer request into the second memory, the controller selects the physical layer to transfer the data from the second memory to the host based on a first period until the data is ready for transmission after data transfer is requested.

19 Claims, 13 Drawing Sheets

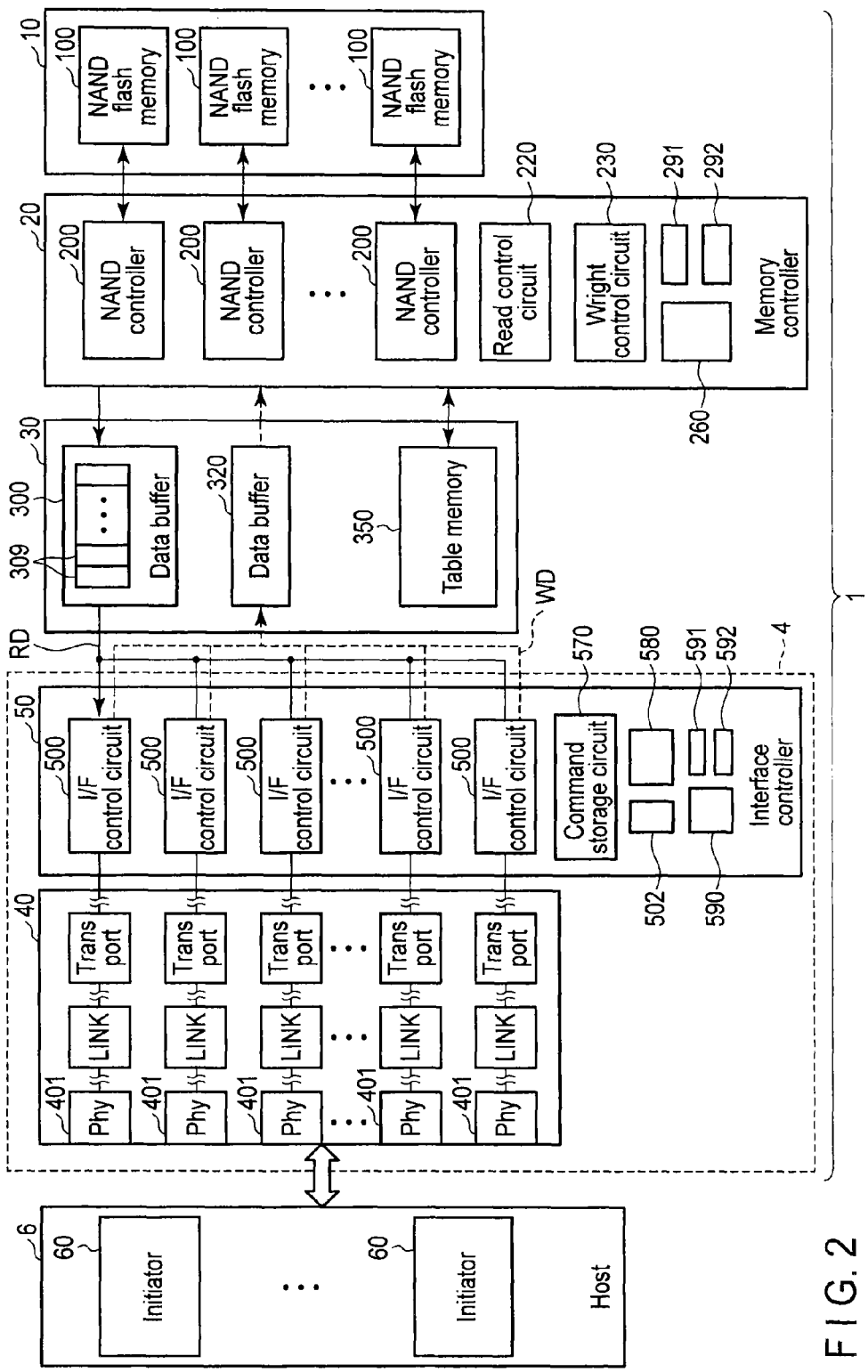
F I G. 2

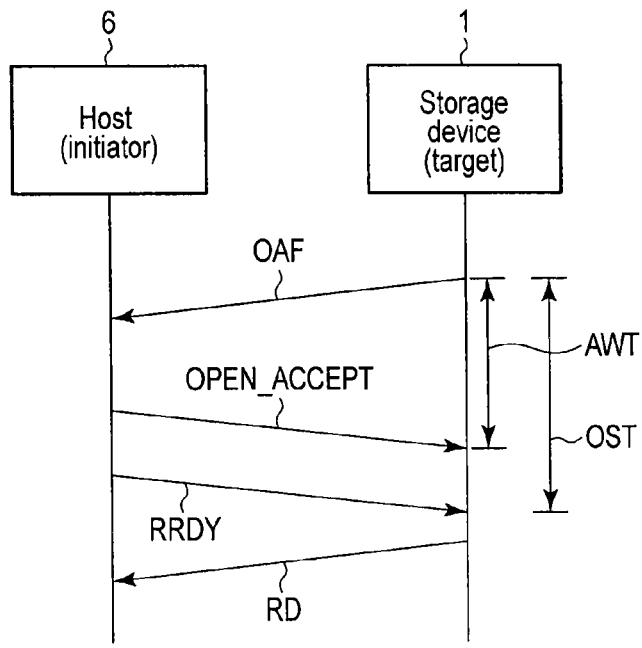
F I G. 4
| Byte/Bit | 7 | 6 | 5 | 4 | 3 | 2 | 1 | 0 |
|---|---|---|---|---|---|---|---|---|
| 0 | INIT | PROTOCOL | | | ADDRESS FRAME TYPE (1h) | | | |
| 1 | FEATURES | | | | CONNECTION RATE | | | |
| 2 3 | INITIATOR CONNECTION TAG | | | | | | | |
| 4 ... 11 | DESTINATION SAS ADDRESS | | | | | | | |
| 12 ... 19 | SOURCE SAS ADDRESS | | | | | | | |
| 20 | SOURCE ZONE GROUP | | | | | | | |
| 21 | PATHWAY BLOCKED COUNT | | | | | | | |
| 22 23 | ARBITRATION WAIT TIME (AWT) | | | | | | | |
| 24 ... 27 | MORE COMPATIBLE FEATURES(00000000h) | | | | | | | |
| 28 ... 31 | CRC | | | | | | | |
F I G. 5

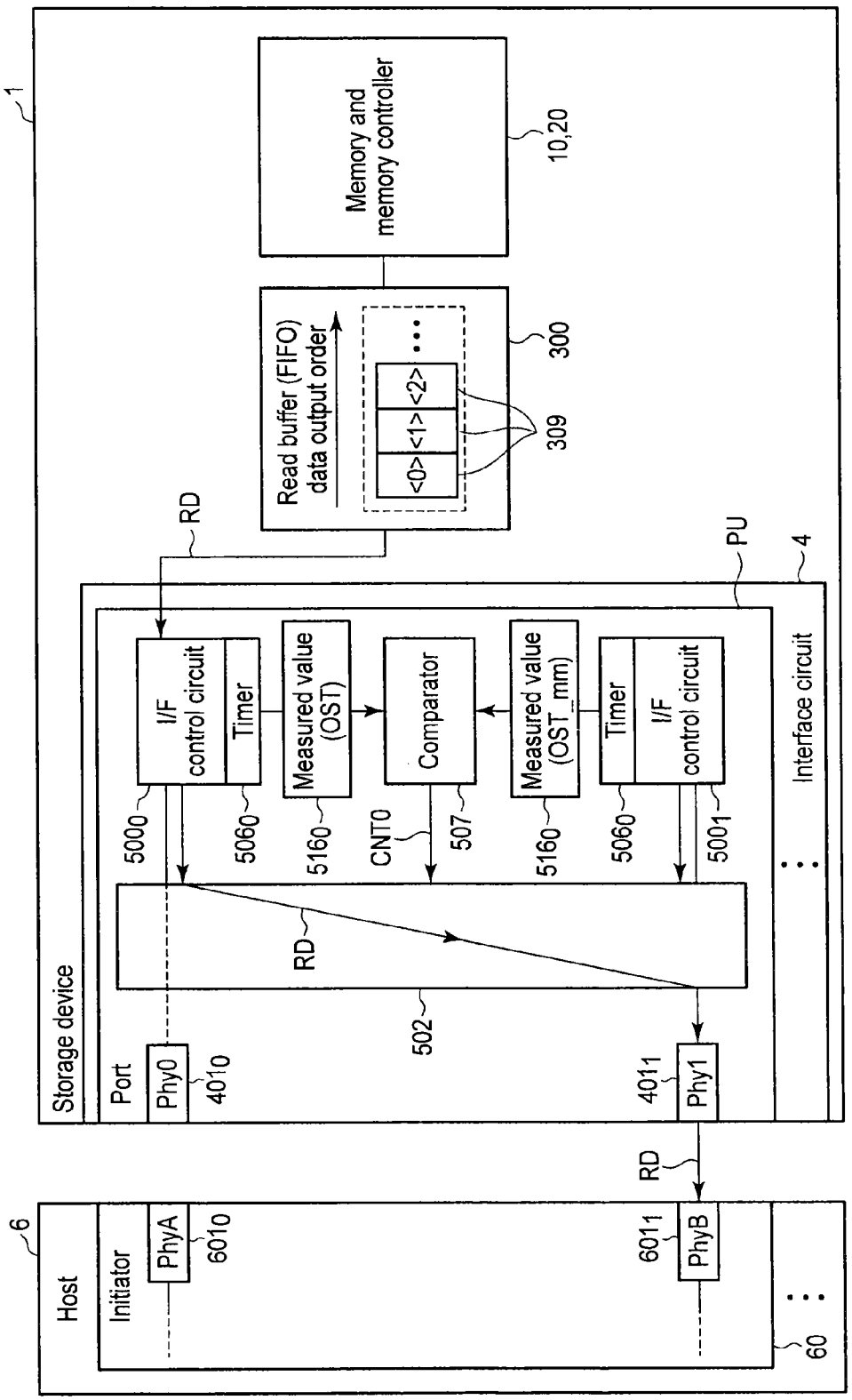
F I G. 6

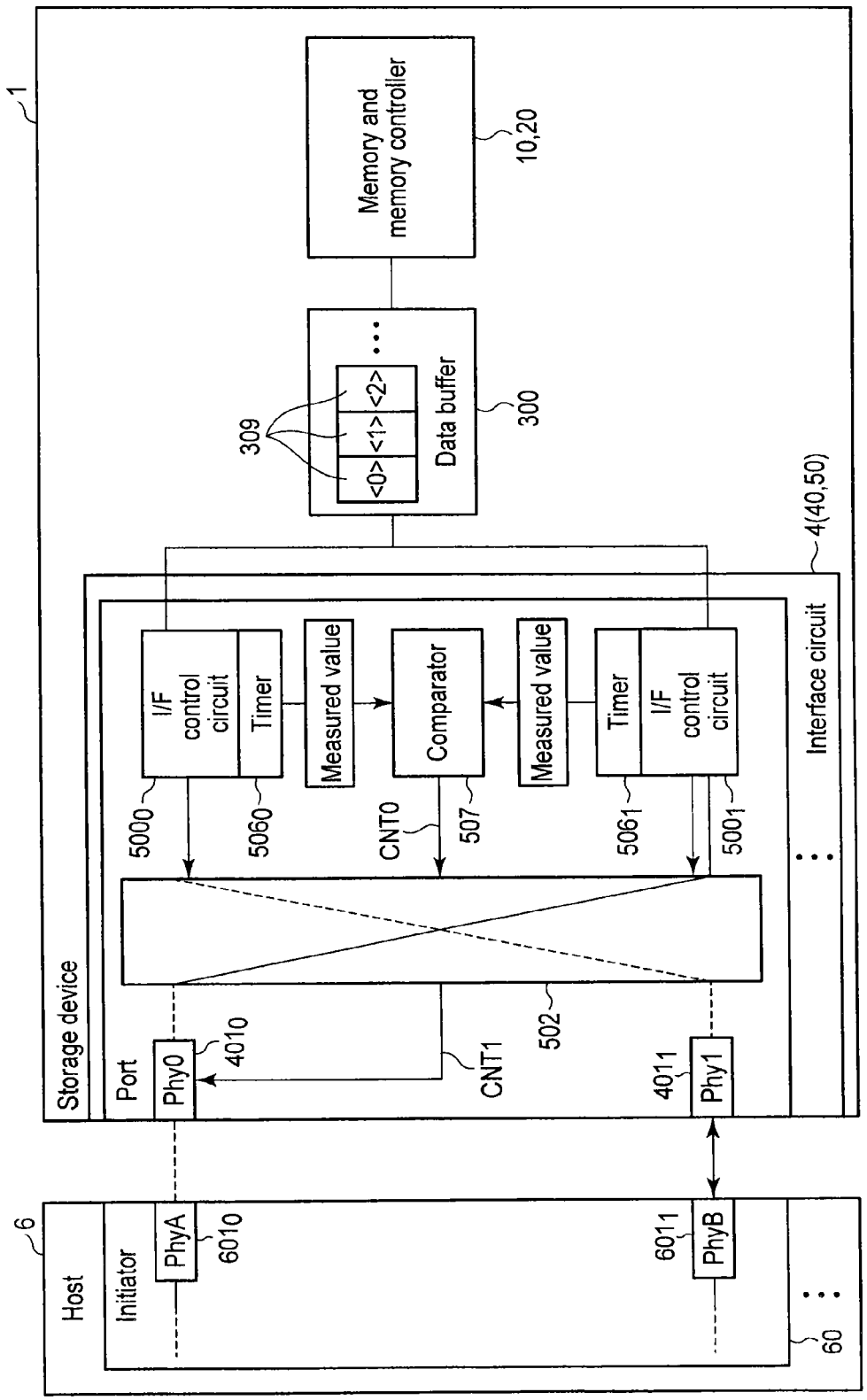
F I G. 8

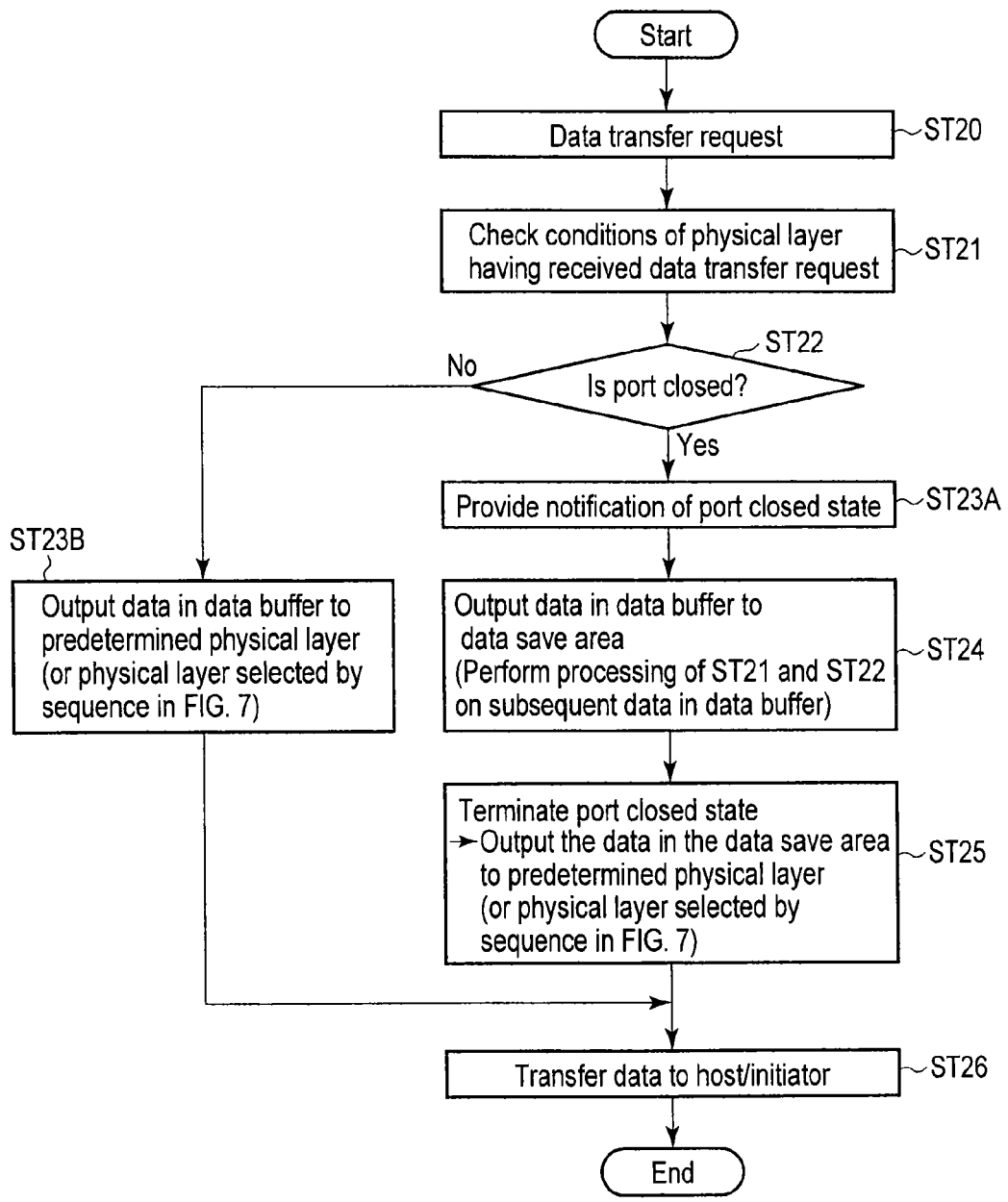
F I G. 10

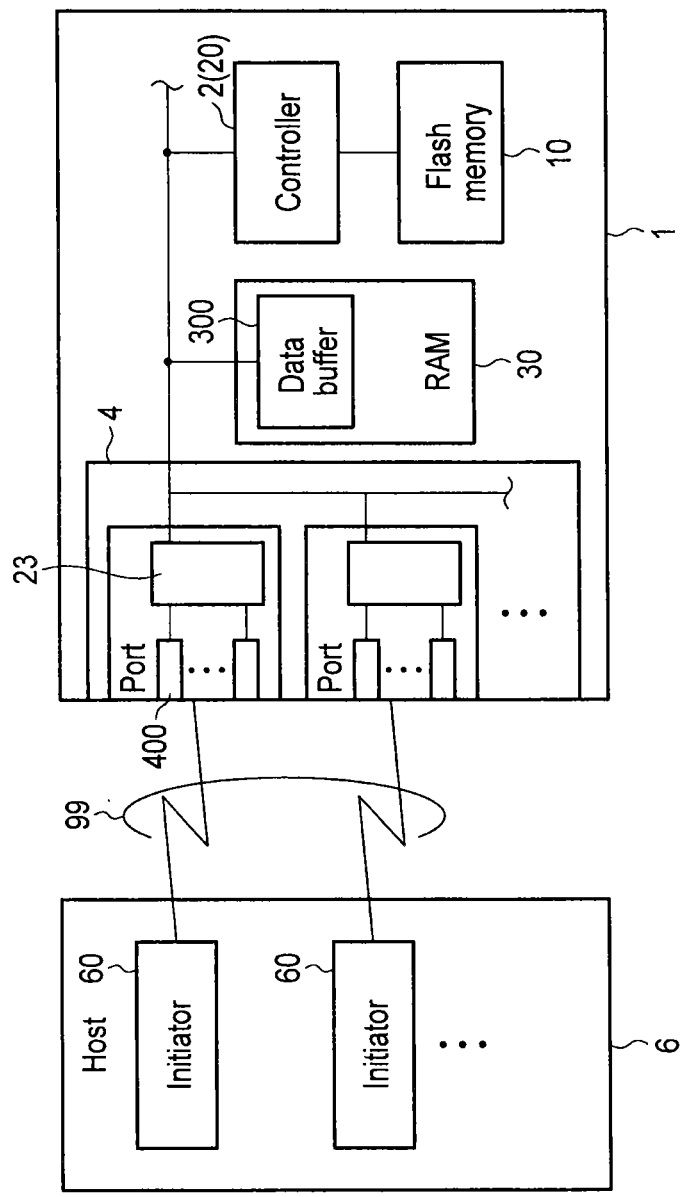
F I G. 12

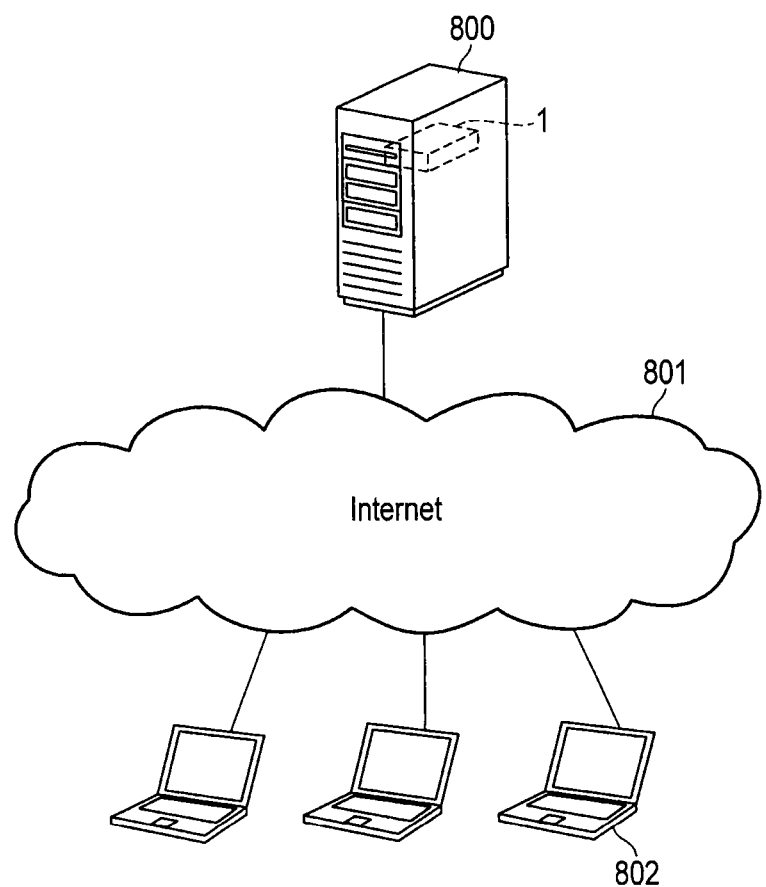
F I G. 15

STORAGE DEVICE AND STORAGE SYSTEM

CROSS-REFERENCE TO RELATED APPLICATIONS

This application claims the benefit of U.S. Provisional Application No. 61/788,309, filed Mar. 15, 2013, the entire contents of which are incorporated herein by reference.

FIELD

Embodiments described herein relate generally to a storage device and a storage system.

BACKGROUND

In recent years, a storage device using a semiconductor memory (for example, a flash memory) is used in computers and servers.

In these apparatuses, improved efficiency in data transfer between the storage device and host is demanded to increase the processing speed.

BRIEF DESCRIPTION OF THE DRAWINGS

FIG. 2 is a schematic diagram of an internal configuration of the storage device;

FIG. 4 is a diagram illustrating an operation example of the storage device in the first embodiment;

FIG. 5 is a diagram illustrating an operation example of the storage device in the first embodiment;

FIG. 6 is a diagram illustrating an operation example of the storage device in the first embodiment;

FIG. 8 is a diagram illustrating an operation example of a storage device in a second embodiment;

FIG. 10 is a flow chart illustrating an operation example of the storage device in the third embodiment;

FIG. 12 is a diagram showing a modification example of a storage device in an embodiment;

FIG. 15 is a diagram showing an application example of the storage device in the embodiment.

DETAILED DESCRIPTION

Figure 1:
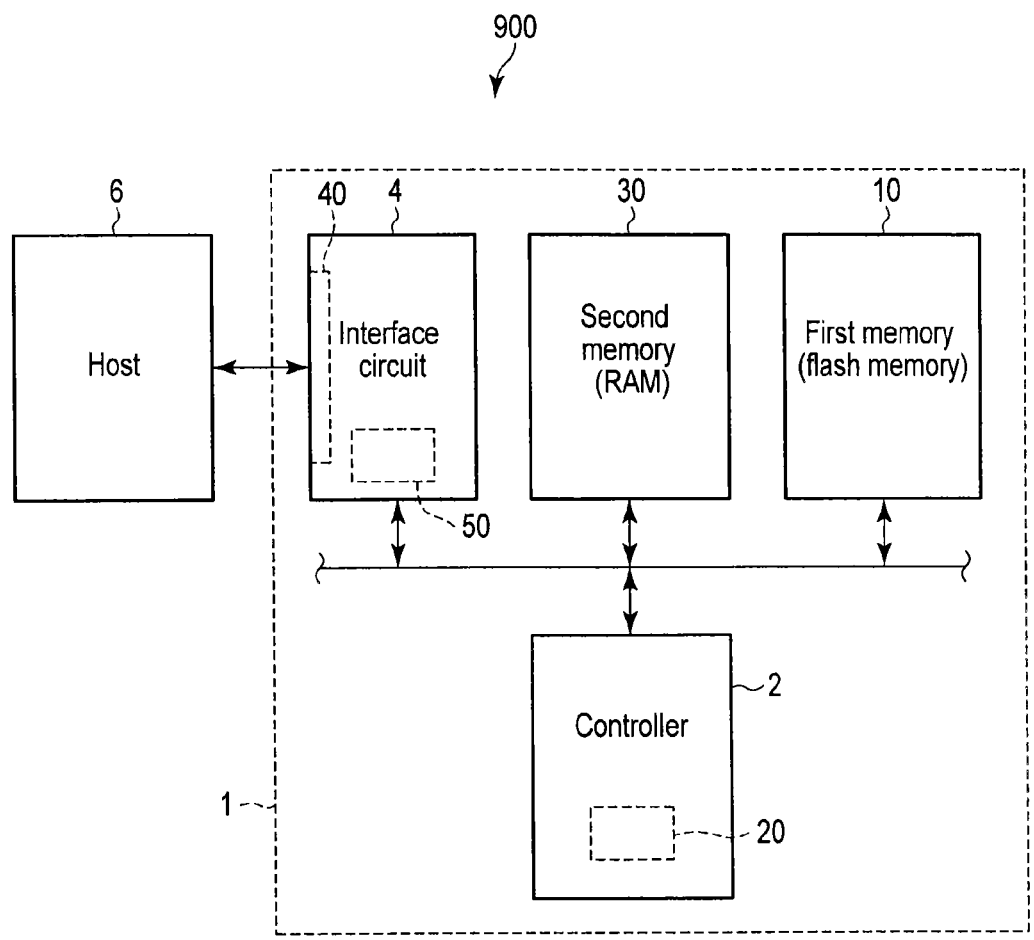
FIG. 1 is a diagram illustrating an overall configuration of a storage device.

The present embodiment will be described in detail below with reference to the drawings. In the description that follows, the same reference numerals are attached to elements having the same function and configuration to provide a duplicate description only when necessary.

In general, according to one embodiment, a storage device includes a first memory that stores data; an interface that includes a plurality of first physical layers and connects a host and the first memory; a second memory that temporarily stores the data transferred between the host and the first memory via the interface; and a controller that controls operations of the first and second memories and the interface. When the data is transferred from the first memory to the host based on a data transfer request from the host, the controller reads the data in the first memory corresponding to the data transfer request into the second memory and the controller selects the physical layer to transfer the data corresponding to the data transfer request from the host from the second memory to the host from among the physical layers based on a first period until the data is ready for transmission after data transfer in each of the physical layers is requested.

(1) First Embodiment

A storage device in a first embodiment will be described with reference to FIGS. 1 to 7.

(a) Configuration

The configuration of a storage device in the first embodiment will be described with reference to FIGS. 1 to 7.

FIG. 1 is a block diagram schematically showing an overall configuration of the storage device in the present embodiment.

A storage device 1 in the present embodiment is, for example, an SSD (Solid State drive).

As shown in FIG. 1, an SSD 1 as a storage device includes a first memory 10, a controller 2, a second memory 30, and an interface circuit 4.

A host 6 as an external device to the storage device 1 is connected to the storage device 1 to build one system.

The first memory 10 stores data from the host. The first memory 10 is, for example, a nonvolatile memory. As the first memory 10, for example, a NAND flash memory is used.

The second memory 30 temporarily stores data written from the host 6 to the first memory 10, data read from the first memory 10 to the host 6, data provided from outside to manage the memory 10, or data generated inside the storage device 1 to manage the memory 10. As the second memory 30, a random access memory (RAM) is used.

The interface circuit (also called a host interface circuit) 4 connects the storage device 1 and the host 6 so that the memory 10 in the storage device 1 and the host 6 can perform data communication. Data between the memory 10 (and the memory 30) and the host 6 is transferred via an interface 40. The interface in a storage device is an element to control connection between two different devices. For example, interfaces conforming to each other are each provided in one device and the other device.

The controller 2 controls and manages the operation of each component (circuit) 10, 30, 40 in the storage device 1. In the present embodiment, the controller 2 that controls/manages all internal operations of the storage device 1 (SSD in this case) is called the device controller (or the SSD controller) 2. For example, the device controller 2 includes a memory controller 20 that controls and manages the operation of the memories 10, 30 in the storage device 1.

FIG. 2 is a block diagram showing a concrete example of the internal configuration of the storage device in the present embodiment. In FIG. 2, principal units of internal components of the storage device in the present embodiment are extracted and illustrated.

For example, the first memory 10 includes a plurality of NAND flash memories 100. However, as the first memory 10, for example, a flash memory other than the NAND flash memory may be used. Also, as the first memory 10, a resistance change type memory like an MRAM (Magnetoresistive RAM), ReRAM (Resistive RAM), or PCRAM (Phase Change RAM) may be used.

The memory controller 20 in the device controller 2 includes a plurality of NAND controllers (also called flash memory controllers) 200 to control each of the plurality of NAND flash memories 100.

The memory controller 20 controls the operation of the RAM 30. The input/output of data between the flash memory 100 and the RAM 30 is controlled by the memory controller 20.

The memory controller 20 includes a read control circuit 220. The read control circuit 220 reads data from the flash memory 100 and controls reading of data between the flash memory 100 and the RAM. The read control circuit 220 may be provided in the NAND controller 200.

In addition to the NAND controller 200 and the read control circuit 220, the memory controller 20 includes a write control circuit 230 that controls writing of data to the flash memory 100 and a circuit group 260 such as a storage area (buffer). The memory controller 20 also includes firmware 291 and software (drivers, programs) 292 to control the operation of the memories 10, 30.

The RAM 30 includes buffer memories 300, 320 connected to a transmission path (data bus) of data between the memory 10 and the host 6. Hereinafter, the buffer memories 300, 320 connected to the transmission path of data and temporarily storing data will be called the data buffers 300, 320.

The data buffers 300, 320 temporarily store data RD, WD transferred between the flash memory 100 and the host 6. The data buffer 300 temporarily storing the read data RD from the flash memory 100 to the host 6 is called the read buffer (or the read data buffer) 300. The data buffer 320 temporarily storing the write data WD from the host 6 to the flash memory 100 is called the write buffer (or the write data buffer) 320.

The read buffer 300 outputs data, for example, in FIFO (First-In First-Out) mode. In a memory of the FIFO mode, data input first is output first, in other words, data is output in descending order of storage time of data.

As the read data buffer 300, for example, SRAM (Static RAM) is used to make the data transfer faster. SRAM as the read buffer 300 includes a plurality of data storage areas 309 that can store data in units (fixed data size) so that data transfer can be performed in FIFO mode. Instead of SRAM, MRAM, ReRAM, PCRAM, or DRAM may be used as the read buffer 300.

The RAM 30 includes a memory area 350 other than the data buffers 300, 320. The memory area 350 stores a table (logical-physical table) to manage the address and operation of the flash memory 100 and a management table of the host 6 side provided by the host 6. Hereinafter, a memory that temporarily stores the management table will be called a table memory.

For example, the interface circuit 4 includes the interface 40 and an interface controller 50.

The interface circuit 4 connects the storage device 1 and the host 6. Data transfer between the memory 10 and the host 6 is performed via the interface 40.

The interface controller (hereinafter, also written as the I/F controller) 50 controls the operation of the interface 40.

The interface 40 includes a plurality of physical layers 400. The interface 40 also includes, based on the standard/specifications of the storage device 1, a plurality of link layers 402 and a plurality of transport layers 403. The link layer 402 transfers data (also called a received frame) from the physical layer 400 to the transport layer 403. The link layer 402 transfers data (also called a transmission frame) from the transport layer 403 to the physical layer 400. The transport layer 403 transfers a frame from outside to the interface controller 50. The transport layer 403 transfers a frame from the interface controller 50 to the link layer 402. The transport layer 403 can analyze a received frame. If the frame analyzed by the transport layer 403 includes a command such as a read command or write command, the command is transferred from the transport layer 403 to the application layer (not shown). The connection between the link layer 402 and the transport layer 403 is controlled by a port layer (not shown) provided between the link layer 402 and the transport layer 403.

The transmission path (network structure) of data (frame) between the storage device 1 and the host 6 is built by each layer 400, 402, 403 each having the communication function included in the interface 40. A PHY layer (not shown) and a port layer (not shown) in an interface of the SAS standard are included in a predetermined layer between the termination on the host side of the interface 40 and the interface controller 50.

The interface controller 50 includes a plurality interface control circuit (hereinafter, also called an I/F control circuit, layer control circuit, or transmission path control circuit) 500. The interface control circuit 500 controls the layers on each data transmission path in the interface 40. The interface control circuit 500 is provided so as to correspond to each of the physical layers 400 (and layers).

The interface controller 50 includes, in addition to the interface control circuit 500, for example, a command storage circuit 570 that stores a command from the host and a plurality of circuits (circuit group) 580 to control the interface 40. The circuit group 580 includes an arbiter, a sequencer, a counter, an arithmetic circuit and the like. The interface controller 50 also includes a storage area 590 in which a host-side management table (for example, an initiator table) is stored. The interface controller 50 refers to the initiator table to manage initiators on the host side to control the operation of the interface control circuit 500 and each layer (for example, the physical layer). The initiator table is stored in a storage area in the interface controller 50 or in the RAM 3. The interface controller 50 includes firmware 591 and software (drivers, programs) 592 to control the operation of the interface 40.

In the storage device 1 according to the present embodiment, for example, the interface controller 50 includes a circuit (hereinafter, also called a connection control circuit or connection selection circuit) 502 that controls the connection between the interface control circuit 500 and the physical layer 400 (and layers and transmission paths).

The interface controller 50 may be provided in the device controller 2. Incidentally, the interface 40 and the interface controller 50 may be provided in the device controller 2.

The host 6 transmits (issues, provides notification of) various commands such as a data write request and a data read request and various control signals to the storage device 1. Based on a command/control signal from the host 6, the device controller 2, the memory controller 20, and the interface controller 50 control the operation of each internal component in the storage device 1 such as the memories 10, 30 and the interface 40. Accordingly, the storage device 1 performs an operation in accordance with a request of the host 6. In the present embodiment, issuance or notification of a request (signal) refers to transmission of an instruction by a device/circuit to another device/circuit so that the device/circuit causes the other device/circuit to execute an instruction.

The host 6 includes at least one initiator 60. The initiator 60 transmits various commands/control signals to the connected storage device 1. The command/control signal transmitted from the initiator is received by the physical layer 400 of the interface 40. Incidentally, a device on the side of receiving a command/control signal from the initiator 60 is called a target.

An expander (not shown) may be provided between the storage device 1 and the host 6 so that the storage device 1 and the host 6 transmit and receive commands and data via the expander.

A storage device (SSD) in the present embodiment performs data transfer between the host 6 and the memories 10, 30 through an interface based on the SAS (Serial Attached SCSI) standard. As a communication protocol of an SAS interface, for example, a communication protocol conforming to the SCSI standard such as SSP (Serial SCSI Protocol) or SMP (Serial Management Protocol) is used. Hereinafter, a storage device (or SSD) that performs data transfer based on the SAS standard may be called an SAS device.

Figure 3:
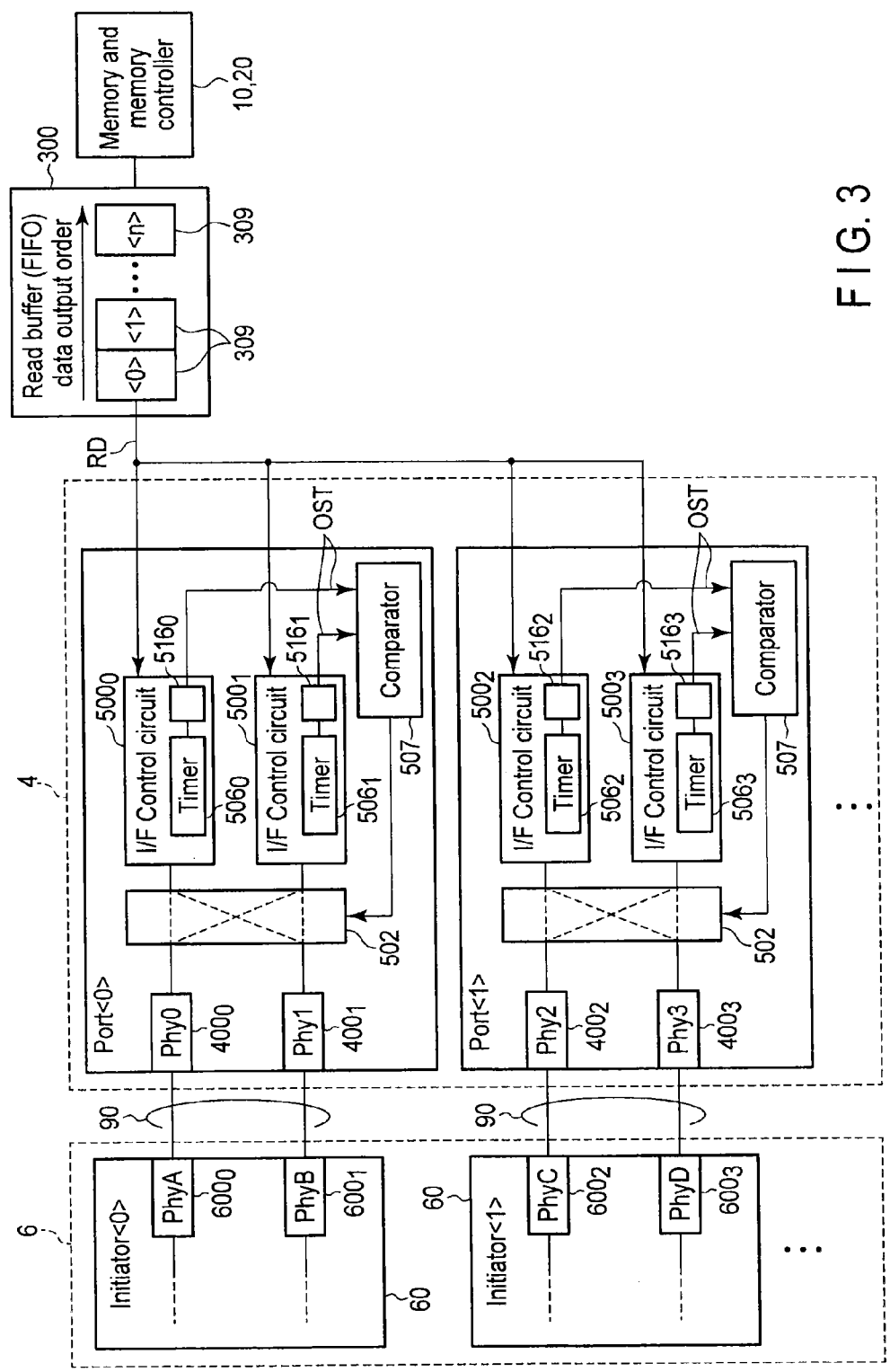
FIG. 3 is a schematic diagram of an internal configuration example of a storage device in a first embodiment.

FIG. 3 is a diagram schematically showing a configuration example of the interface in a storage device in the present embodiment. In FIG. 3, principal units of the storage device 1 used to transfer data from the storage device 1 to the host 6 in the present embodiment are extracted and illustrated. In FIG. 3, the illustration of the link layer and the transport layer in the interface 40 is omitted.

As shown in FIG. 3, in the storage device (for example, SSD) 1 that performs data transfer based on the SAS standard, the one read buffer 300 in the storage device 1 is connected to a plurality of layers such as the physical layer 400 to be a transmission path of data between the storage device 1 and the host 6 via interface control circuits $500_0$, $500_1$, $500_2$, $500_3$.

As described above, the storage device 1 includes a plurality of physical layers $400_0$, $400_1$, $400_2$, $400_3$. Hereinafter, when the physical layers $400_0$, $400_1$, $400_2$, $400_3$ are not to be distinguished, the physical layer is written as the physical layer 400. In the present embodiment, the physical layer is a layer (first layer) positioned at the termination on the host side of a transmission path formed of a plurality of layers in the interface. In the present embodiment, the physical layer may be described by including the function of the PHY layer.

The control unit called a "port" including one or more physical layers $400_0$, $400_1$, $400_2$, $400_3$ is set to the interface 40 in the storage device 1 of an SAS device.

The storage device 1 in FIG. 3 includes one or more ports PU<0>, PU<1>, . . . . Hereinafter, when the ports PU<0>, PU<1>, . . . are not to be distinguished, the port is written as the port PU.

When one port PU includes the two physical layers 400 or more, the port is called a "wide port". Further, the data transfer method in which a plurality of physical layers is used for one initiator on the host side is called a "wide link".

In the wide link/wide port method, a plurality of parallel transmission paths formed of a plurality of the physical layers 400 in one port PU to connect the storage device 1 and the host 6 is regarded as one large transmission path 90.

In FIG. 3, an example in which one port PU includes the two physical layers (first and second physical layers) 400 is shown. However, one port PU may include the three physical layers 400 or more.

Interface control circuits (layer control circuits) $500_0$, $500_1$, $500_2$, $500_3$ are provided in the interface controller 50 so as to correspond to the physical layers $400_0$, $400_1$, $400_2$, $400_3$ in the interface 40. Hereinafter, when the interface control circuits $500_0$, $500_1$, $500_2$, $500_3$ are not to be distinguished, the interface control circuit is written as the interface control circuit 500.

When, for example, a wide port is used for the interface 40, as many interface control circuits 500 as the number of the physical layers 400 in one port (wide port) are allocated to one port PU.

The interface control circuit 500 controls the operation of the physical layer 400 (and each layer). The interface control circuit 500 causes the physical layer 400 (and each layer) to perform an operation in accordance with instructions from the host/initiator 6, 60 based on commands/control signals from the host/initiator 6, 60. The interface control circuit 500 transmits a control signal (for example, an open request) to the physical layer (layer) so that the interface control circuit 500 and the physical layer 400 (each layer) are connected to each other. The interface control circuit 500 can detect and grasp operation conditions of the physical layer 400 and each layer.

As described above, for example, the host 6 includes a plurality of the initiators 60. Each of the plurality of initiators 60 independently transmits a command/control signal to the storage device 1.

Each of initiators $60_0$, $60_1$ includes one or more physical layers $600_0$, $600_1$, $600_2$, $600_3$. When the initiators $60_0$, $60_1$ are not to be distinguished, the initiator is written as the initiator 60. When the physical layers $600_0$, $600_1$, $600_2$, $600_3$ of the initiator 60 are not to be distinguished, the physical layer is written as the physical layer 600.

For example, the interface of the initiator 60 may be, like the storage device (SAS device) 1 as a target, a wide port. The initiator 60 and the storage device 1 are connected directly or via an expander so that the port of the initiator 60 is connected to a predetermined port PU in the target. For example, the number of the physical layers 600 in the port of the initiator 60 is the same as the number of the physical layers 400 in the port PU of the target.

When, as shown in FIG. 3, a plurality of ports PU is provided in the storage device 1, each port PU is controlled and driven by the interface controller 50 independently of each other. Each port PU is configured and the operation of each port PU is controlled so that when, for example, an error occurs in the one physical layer 400 of a port PU, the data transfer in the physical layer of other ports PU is continued without being affected by the error of the port PU.

In the interface circuit 4 of the wide port/wide link in a storage device in the present embodiment, each port PU is formed in the interface circuit 4 in such a way that data to be transmitted from the one physical layer 400 can be transmitted from the other physical layer 400 in the same port PU to the host/initiator 6, 60. Then, the operation of each port PU and the physical layer 400 (and each layer) is controlled by the interface control circuit 500 and the connection selection circuit 502.

For example, the host and the storage device are enabled to transfer data by the following operation.

FIG. 4 is a sequence chart showing an example of a sequence of the data transfer between the host and the storage device.

To transmit and receive data between the initiator 60 (or the host 6) and the target (storage device) 1 according to the SAS standard, the target 1 and the initiator 60 are caused to be in a connected state (hereinafter, may be written as "Connected") by an open sequence.

When, like the example shown in FIG. 4, the target 1 requests inter-device connection from the initiator 60 in response to a data transfer request (or an open request) from the initiator 60 to the target 1, the target (storage device) 1 to be the transmission source of data transmits an open address frame OAF as a connection request to the initiator (host) 60 to be the transmission destination of data. For example, the interface control circuit 500 controls the physical layer 400 and each layer so that an open address frame OAF is transmitted to the host 6.

An open sequence between the initiator and the host is started at the timing of reception of the data transfer request or transmission of the open address frame OAF.

When the initiator 60 receives the open address frame OAF, the initiator 60 transmits "OPEN_ACCEPT" as a control signal to the target 1 so as to respond to the open address frame OAF. "OPEN_ACCEPT" is a signal (primitive) indicating that the connection of the target 1 to the initiator 60 is permitted.

The target 1 and the initiator 60 are in a connected state after "OPEN_ACCEPT" is received by the target 1. The connection between the target 1 and the initiator 60 is thereby established.

If, for example, the initiator 60 cannot be connected to the target 1 in response to the open address frame OAF from the target 1, the initiator 60 transmits a signal (for example, "OPEN_REJECT") indicating the rejection of inter-device connection to the target 1.

If the initiator 60 becomes ready for receiving data after "OPEN_ACCEPT" is transmitted, a signal (hereinafter, called a data transmission credit) "RRDY" indicating that the initiator 60 is ready for receiving data from the target 1 is transmitted from the initiator 60 to the target 1.

Based on the data transmission credit (primitive) "RRDY", data (read data) from the target 1 is transmitted from the target 1 to the initiator 60 under the control of each controller 2, 20, 50.

FIG. 5 shows the configuration of an open address frame.

As shown in FIG. 5, the open address frame OAF is a command including information to establish connection between the target 1 and the initiator 60 and includes the protocol, addresses, and CRC (Cyclic Redundancy Check).

The open address frame OAF includes ARBITRARION WAIT TIME (hereinafter, also written as AWT). AWT indicates a wait time (period) before connection is established between two devices after one device makes a request of connection to the other device. As an example, the time (period) between the transmission of an open address frame by a device on the data transmitting side to a device on the data receiving side and the reception of "OPEN_ACCEPT" by the device on the data transmitting side from the device on the data receiving side corresponds to AWT.

The value of AWT (hereinafter, called the AWT value) in the open address frame OAF is different from sequence to sequence in accordance with the current operating conditions (data transfer state) of the physical layer 400 (or the port). The time for an open sequence differs according to the device (for example, by initiator and physical layer) and open sequence.

Because an open sequence is started at an appropriate timing for each of the initiator 60 and the target 1, a conflict of the open address frame OAF may occur between the initiator 60 and the target 1. In general, when a conflict of the open address frame OAF occurs, priority is given, among a plurality of open address frames OAF, to the open address frame OAF whose AWT value is large in the protocol of SAS.

In the present embodiment, the time until the data transfer becomes possible after the reception of a command from the host 6 in each of the physical layers 400, for example, a request of data transfer is measured and managed by the interface controller 50. Based on the measurement and management of the time (period), the storage device 1 in the present embodiment predicts and detects the physical layer 400 in which the transfer of data is less likely to stagnate in a data transfer sequence of the storage device 1. The storage device 1 in the present embodiment selects and drives the detected physical layer 400 in which the transfer of data is less likely to stagnate and accesses the host 6 via the physical layer 400.

As described above, a plurality of the physical layers 400 in one wide port PU are regarded as the one transmission path 90. In the present embodiment, when, for example, a physical layer (for example, Phy0) $400_0$ in a port (for example, the port PU<0>) receives a command (data transfer request) from the host 6, the data corresponding to the command can be transmitted from the other physical layer (Phy1) $400_1$ in the same port PU<0> to the host 6. Conversely, data corresponding to a command received by the physical layer (Phy1) $400_1$ may be transmitted from the physical layer (Phy0) $400_0$ to the host 6.

Thus, if the data transfer in a physical layer 400 may be delayed/stagnated in a port PU in the interface 40 of the wide port system, data may be transferred from the other physical layer 400 in the common port.

When, for example, data in the memory 10 (flash memory 100) in a storage device in the present embodiment is transferred to the host 6 (initiator 60), the data is transferred to the host 6 from the one physical layer 400 in which, compared with the other physical layers 400 in the port, data transfer is less likely to stagnate. Accordingly, a storage device in the present embodiment can make the data transfer from the data buffer (for example, SRAM in the FIFO method) 300 to the host 6 more efficient. While an SRAM can operate at high speed, its cost is high and it is difficult to increase the capacity thereof. Thus, when an SRAM in FIFO mode is used as the read data buffer 300, improved efficiency in data transfer becomes more pronounced by detecting and selecting the physical layer 400 in which, like the present embodiment, data transfer is less likely to stagnate and performing data transfer by the physical layer 400.

The storage device 1 in the present embodiment detects and selects the latest available physical layer 400 to perform data transfer between the storage device 1 and the host 6.

FIG. 6 is a schematic diagram illustrating a concrete example and an operation example of the internal configuration of an interface circuit in the storage device 1 in the present embodiment.

As shown in FIGS. 3 and 6, the interface control circuits $500_0$, $500_1$, $500_2$, $500_3$ corresponding to the physical layers $400_0$, $400_1$, $400_2$, $400_3$ in the present embodiment include timers $506_0$, $506_1$, $506_2$, $506_3$ respectively. The timers $506_0$, $506_1$, $506_2$, $506_3$ measure periods OST, OST_mm until data is ready for transmission after the transfer of data is requested from the initiator 60. Hereinafter, the timers $506_0$, $506_1$, $506_2$, $506_3$ for measuring the periods OST, OST_mm until data is read for transmission after the start of an open sequence may also be called the sequence timers $506_0$, $506_1$, $506_2$, $506_3$. When the sequence timers $506_0$, $506_1$, $506_2$, $506_3$ are not to be distinguished, the sequence timer is written as the sequence timer 506.

The time indicated by the sequence timer 506 is an internal time of the storage device 1.

The sequence timer 506 may be provided by a circuit such as a counter or by software (or firmware).

The sequence timer 506 is activated when an open sequence is started and stopped when a frame (data) requested from the initiator becomes ready for transmission (data transmission is permitted).

For example, the start of an open sequence is the timing of an open address frame OAF in response to a data transfer request from the host 6 (initiator 60). When, for example, transmission/reception of relatively high-speed data/signal is considered, the start of an open sequence may be considered to be substantially the same timing as the timing when the host 6 transmits a data transfer request or the timing when the storage device 1 receives a data transfer request from the host 6. For example, the transmission of data in response to a data transfer request becomes ready in the timing when a data transmission credit "RRDY" is received from the host 6 (initiator 60).

The times OST, OST_mm between the activation of the sequence timer 506 and the stop of the sequence timer 506 are times dependent on the host 6 (or the initiator 60). Thus, the period between activation and stop of the sequence timer 506 differs for each connection between the host/initiator 6, 60 and the storage device 1. Thus, the time between the start of an open sequence and the start of frame transmission is measured for each open sequence of each of the physical layers 400.

Hereinafter, the periods (times) OST, OST_mm until data is ready for transmission after the start of an open sequence are called the open sequence times (or the first periods or the data transfer start ready times) OST, OST_mm. For example, the start of an open sequence uses the time when a device on the data transmitting side transmits an open address frame to a device on the receiving side as the reference. However, the start of an open sequence may use the time when a data transfer request from the host is received as the reference. The end of an open sequence uses the time when a data transmission credit is received as the reference.

The open sequence time OST of each of the physical layers 400 practically indicates the time when data in each of the physical layers 400 in the storage device 1 is ready for transmission (hereinafter, called the data transfer start time).

The value (hereinafter, called the measured value) OST, OST_mm measured by each of the sequence timers $506_0$, $506_1$, $506_2$, $506_3$ is temporarily held by registers $516_0$, $516_1$, $516_2$, $516_3$ in the interface control circuits $500_0$, $500_1$, $500_2$, $500_3$ when the timer 506 is stopped.

A comparator 507 compares the measured values OST, OST_mm held in each of the registers 516. When the interface 40 is controlled by a wide port, the comparator 507 is provided in each port. However, the comparator 507 may be provided in such a way that the one comparator 507 is commonly used for a plurality of ports (a plurality of wide ports). The comparator 507 may be provided in the connection control circuit 502 as a portion of the configuration of the connection control circuit 502.

Based on comparison results of measured values by each of the sequence timers 506 by the comparator 507, among a plurality of the physical layers 400, the physical layers 400 whose open sequence time OST is short, more specifically, the physical layer having the shortest open sequence time OST_mm among a plurality of open sequence times OST, for example, the physical layer (Phy1) $400_1$ is determined.

The comparator 507 outputs comparison results of measured values of each of the sequence timers 506 to the connection control circuit 502 as a control signal CNT0.

Based on the control signal CNT0 from the comparator 507, the connection control circuit 502 controls the connection between the interface control circuit 500 and the physical layer 400 so that the physical layer 400 having the shortest open sequence time OST_mm is connected to the read buffer 300 (or the interface control circuit 500 holding data from the read buffer).

The interface control circuit 500 makes an open request to the physical layer 400 having the shortest open sequence time OST_mm by priority so that the interface control circuit 500 and the physical layer 400 having the shortest open sequence time OST_mm when data is transferred to the initiator after the data transmission credit "RRDY" is received. That is, the physical layer 400 having the shortest open sequence time OST_mm is used for data transfer by priority so that the physical layer 400 in which data transfer is less likely to stagnate is connected (opened) to the interface control circuit 500 in response to a data transfer request from the host/initiator 6, 60 and read data RD from the interface control circuit 500 can be received.

In the present embodiment, an open request is a request to connect the interface control circuit 500 to the physical layer 400 made by the interface control circuit 500 to the physical layer 400 so that the physical layer is enabled to transmit a signal to the initiator (to receive a signal from the initiator to the physical layer).

The physical layer $400_1$ connected to the interface control circuit $500_0$ due to an open request via the connection control circuit 502 receives data RD from the read buffer 300 to transfer the data from the physical layer 400 to the initiator 60.

Data received by the physical layer 400 of the shortest open sequence time OST_mm from the read buffer is, of data stored in a plurality of the data storage areas 309 of the read buffer 300 in FIFI mode, the first data in the order of data output. The interface control circuit 500 receiving data RD from the read buffer 300 may be, for example, the interface control circuit 500 that initially received a data transfer request, the interface control circuit 500 that initially established connection to the initiator, or another circuit 500.

For example, data from the data buffer 300 is read into the interface control circuit $500_1$ corresponding to the physical layer $400_1$ having received a data transfer request at a predetermined timing in a period, for example, until the data transmission credit "RRDY" is received after the reception of the data transfer request. By selecting, like in the present embodiment, the physical layer having the shortest open sequence time OST as the physical layer used for the requested data transfer, data in the read buffer 300 can be read into the interface control circuit before the interface control circuit 500 and the physical layer 400 become ready for transmission/reception of data.

For example, a measured value by the sequence timer 506 is configured to be adjustable by firmware (program) in the interface controller 50 (or the memory controller 20). Accordingly, the priority of the physical layer 400 used for data transfer can arbitrarily be controlled.

Therefore, the storage device 1 in the first embodiment achieves improved efficiency in data transfer by performing data transfer using, among a plurality of physical layers (layers), the physical layer having a short (the minimum) time until data becomes ready for transfer after the data transfer is requested from the host.

For example, to make the data transfer faster, SRAM in FIFO mode is used as the data buffer 300 to transfer data from the storage device 1 to the host 6. The output order of data is specified in FIFO mode and in general, subsequent data cannot be output before data to be output first in the data buffer 300 is output from the data buffer 300.

In the storage device 1 in the present embodiment, sizes of the periods (first periods, open sequence times, data transfer start ready times) OST, OST_mm until data transfer is ready (for example, until "RRDY" is received) after the data transfer is requested (for example, after the start of an open sequence) in a plurality of the physical layers 400, for example, a plurality of the physical layers 400 belonging to a common port (wide port) are compared by the interface circuit 4 (for example, the comparator of the interface controller 50). Then, based on the comparison result, the physical layer 400 with the minimum period OST_mm until data is ready for transfer after the data transfer is requested is selected and the data transfer is performed by preferentially using the physical layer 400.

Accordingly, according to the present embodiment, data can be transferred by shortening the wait time of data output from the data buffer 300 in the output order of data set to the data buffer 300 in FIFO mode. Thus, a stacked state (stagnation of data output) of the data buffer is reduced.

Therefore, according to a storage device in the present embodiment, improved efficiency in data transfer can be achieved.

(b) Operation

The operation (control method of data transfer) of a storage device in the first embodiment will be described below by using FIG. 7. Here, the operation of a storage device in the present embodiment will be described also by using FIGS. 1 to 6 when appropriate.

Figure 7:
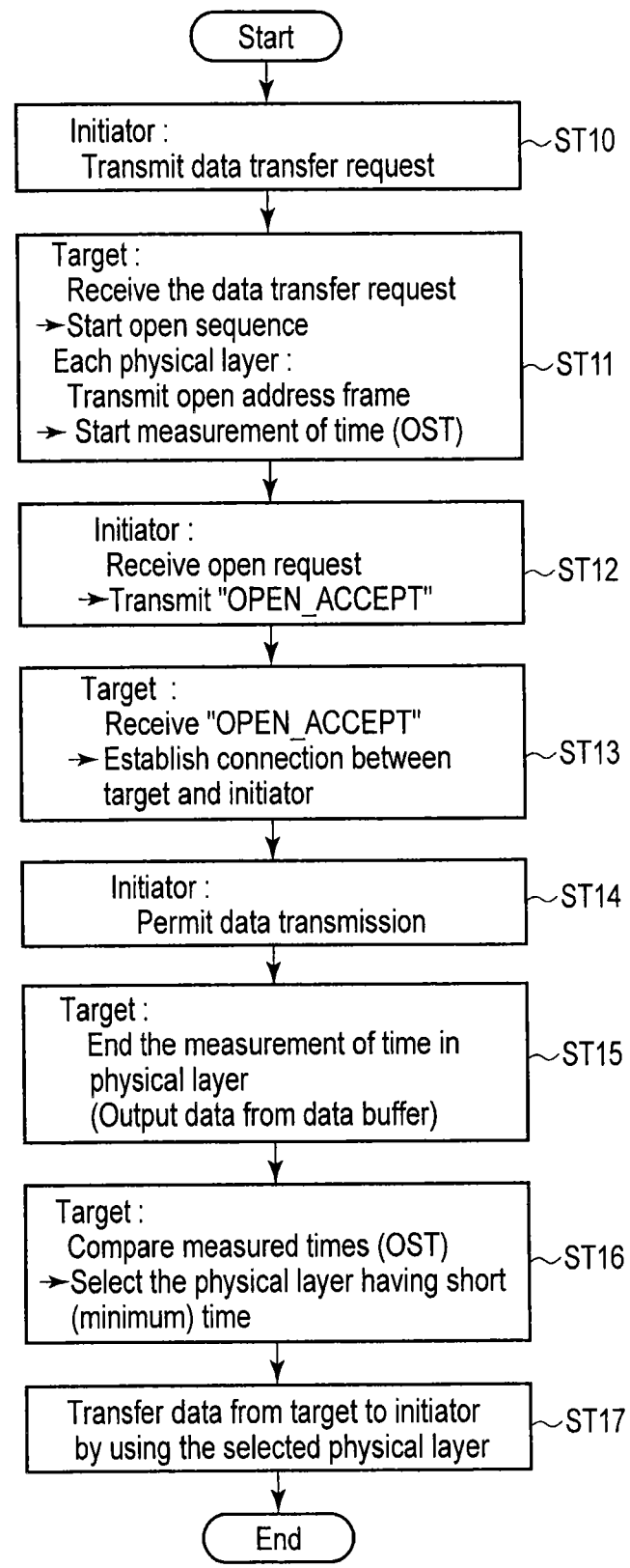
FIG. 7 is a flow chart illustrating an operation example of the storage device in the first embodiment.

FIG. 7 is a flow chart illustrating an operation example of a storage device (for example, SSD) in the first embodiment.

As shown in FIG. 7, a command is transmitted from the host 6 (initiator 60) to the storage device (target) 1 (step ST10). In the operation of the storage device described here, the command from the host 6 is, for example, a data transfer request instructing transmission of data stored in the storage device 1 to the host 6.

Each operation corresponding to a command is prepared by transmission and reception of the command between the host 6 and the storage device 1.

When the interface 40 of the storage device (for example, SAS-SSD) 1 is controlled by a wide port, among a plurality of the physical layers 400 belonging to the common port, a command is input into at least the one physical layer 400, but the plurality of the physical layers 400 belonging to the common port PU are controlled and driven as objects of the operation corresponding to the command.

When the data transfer request from the initiator 60 is received by the storage device 1 as a target, the target 1 starts an open sequence so that the target 1 is connected to the initiator 60. (step ST11)

In synchronization with the start of the open sequence, the flash memory 100 indicated by an address (logical address) included in the data transfer request is accessed under the control of the memory controller 20 based on the management table or the like. Then, data stored at a predetermined address (physical address) in the flash memory 100 is output to the RAM 30 under the control of the memory controller 20 and stored in the predetermined area 309 in the read buffer (for example, SRAM in FIFO mode) 300. In the present embodiment, it is assumed that the data read from the flash memory 100 is stored in the storage area 309 as data to be output as the first data in the order of data output in the read buffer 300 in FIFO mode to simplify the description.

In step ST11, as shown in FIG. 7, the open address frame OAF in each of the physical layers 400 is transmitted from the storage device 1 as a target to the host 6 (initiator 60).

For example, the open address frame OAF in each of the physical layers 400 in the common port (wide port) PU is transmitted to the initiator having transmitted the data transfer request at practically the same timing to request the connection from the initiator 60 under the control of the interface control circuit 500.

At a timing practically synchronized with the transmission of the open address frame OAF, the sequence timer 506 of the interface control circuit 500 corresponding to each of the physical layers 400 is driven. The period (time) until data becomes ready for transmission after the start of an open sequence (for example, the transmission of the open address frame) is counted by the sequence timer 506. In this manner, measurement of the open sequence time (or the data transfer start ready time) by the sequence timer 506 is started. Incidentally, the sequence timer 506 may start measurement of the time until data transfer to the initiator 60 is started at a timing when the target (as concrete examples, a port, physical layer, or interface control circuit) 1 receives the data transfer request.

The open address frame OAF is received by the initiator 60. If the initiator 60 is under conditions allowing to establish connection, the initiator 60 transmits "OPEN_ACCEPT" as a control signal (primitive) in response to the received open address frame OAF to the storage device 1 at a certain timing (step ST12). However, if no connection can be established between the initiator 60 and the target 1, the initiator 60 transmits "OPEN_REJECT".

"OPEN_ACCEPT" from the initiator 60 is input into the port/physical layer of the target 1. The connection between the initiator 60 and the target (port/physical layer) 1 is established by "OPEN_ACCEPT" being received by the target 1 and the initiator 60 and the target 1 are in a connected state (step ST13).

The period between the transmission of the open address frame OAF by the target 1 and the reception of "OPEN_ACCEPT" by the target 1 practically corresponds to AWT. However, in the plurality of the physical layers 400 in the common port PU, the timing of receiving "OPEN_ACCEPT", in other words, AWT may differ from physical layer 400 to physical layer 400 in accordance with operation conditions of the physical layer 400.

After the transmission of "OPEN_ACCEPT", preparations for reception of data are made in a predetermined period on the side of the host/initiator 6, 60. Preparations for reception of data by the initiator (host) are internal processing in the initiator 60 to receive data from the target 1 made by the initiator 60 (or the host 6) before data is received from the target 1 such as securing a storage area in the initiator to store data from the target 1 or starting to drive an internal circuit (arithmetic circuit) in the initiator to process data from the target 1.

For example, when "OPEN_ACCEPT" is received or before "OPEN_ACCEPT" is received, preparations for transmission of data are made in the storage device 1 as the target 1. Preparations for transmission of data in the storage device (target) are internal processing in the target 1 (or the storage device 1) to transmit requested data to the host/initiator 6, 60 such as reading requested data or creating a frame including requested data.

When preparations for reception of data are completed, the host/initiator 6, 60 transmits a data transmission credit "RRDY" as a control signal (primitive) to permit data transmission to the storage device 1 (step ST14).

When the target 1 receives the data transmission credit "RRDY", data can be transmitted from the target 1 to the initiator 60. At a timing practically synchronized with the reception of the data transmission credit "RRDY", the sequence timer 506 stops the measurement of the open sequence time (data transfer start ready time) (step ST15). The timing when the physical layers 400 and the interface control circuits 500 in a wide port receive "RRDY" differs in accordance with respective operation conditions of the physical layers 400 and the interface control circuits 500.

In this manner, the period until data transfer is ready to start after the data transfer is requested in each of the physical layers 400 is obtained by the timer 506 provided in the interface control circuit 500.

Data RD from the data buffer 300 in response to a data transfer request is input into the interface control circuit $500_0$ corresponding to the physical layer having first received the data transfer request (command), for example, the physical layer (Phy0) $400_0$, in the output order specified by FIFO at a predetermined timing in a period until a data transmission credit is received after reception of the data transfer request.

The measured open sequence times OST, OST_mm are temporarily stored in the register 516 in the interface control circuit 500.

The measured open sequence times OST, OST_mm of each of the physical layers 400 are input into the comparator 507 in the interface controller 50 (or the connection control circuit 502). The measured open sequence times OST, OST_mm of each of the physical layers 400 are compared by the comparator 507 (step ST16). Accordingly, the physical layer 400 having the minimum open sequence time OST_mm is determined (detected). For example, the second physical layer (Phy1) $400_1$ has the minimum open sequence time OST_mm.

The comparator 507 outputs comparison results of open sequence times to the connection control circuit 502 as the control signal CNT0.

For example, the interface control circuit 500 outputs a control signal (open request) to the physical layer 400 so that the interface control circuit 500 is connected to the physical layer 400 in response to the reception of the data transmission credit "RRDY".

The control signal CNT0 based on the comparison result of the comparator 507 is input into the connection control circuit 502 and the operation of the connection control circuit 502 is controlled by the control signal CNT0. If, for example, the open sequence time OST_mm of the physical layer $400_1$ is smaller than the open sequence time OST of the physical layer $400_0$, the physical layer $400_1$ is connected by the connection control circuit 502 to the interface control circuit 500 into which data RD from the data buffer 300 is input.

Data is transferred from, among a plurality of the physical layers 400 belonging to the same wide port PU, the physical layer $400_1$ having the minimum open sequence time OST_mm to the initiator 60 (step ST17). If the open sequence time of the physical layer having received a data transfer request is the smallest among the plurality of the physical layers 400, data is transferred from the physical layer 400 having received the data transfer request to the initiator 60.

The data transfer of a storage device according to the present storage device is performed as described above.

According to a storage device in the present embodiment, as described by using FIGS. 2 to 7, the physical layer that can start data transfer, compared with the other physical layers 400 belonging to a common wide port, in earlier timing is detected based on a comparison result of the times OST, OST_mm until the data transfer becomes ready after the request of the data transfer.

The detected physical layer is selected as the physical layer 400 to transfer data requested from an initiator and the data transfer between the initiator (host) and the target (storage device) is performed. Accordingly, even if a data buffer (for example, SRAM) in FIFO mode is used, the influence of a stacked state of the data buffer and the delay of data transfer can be reduced.

Therefore, according to a control method of a storage device in the first embodiment, improved efficiency in data transfer can be achieved.

(2) Second Embodiment

A storage device in a second embodiment will be described with reference to FIG. 8.

For example, in an interface circuit using a wide port, when an open request is made to a physical layer 400, a plurality of the physical layers 400 and the physical layer having the minimum open sequence time (the physical layer that can start data transfer earliest) may be in use.

In the present embodiment, the physical layer 400 (and each layer) and an interface control circuit 500 are controlled by a connection control circuit 502 so that unused physical layers or the physical layers 400 having the open sequence time OST other than the minimum open sequence time (for example, the physical layer having the second smallest open sequence time) are more likely to be selected.

The connection control circuit 502 detects operation conditions of the physical layer 400 and the interface control circuit 500 to determine whether the physical layer 400 is in use.

FIG. 8 is a schematic diagram illustrating a configuration example and an operation example of a storage device in the present embodiment.

For example, in a storage device 1 in the present embodiment, as shown in FIG. 8, the connection control circuit 502 outputs a control signal CNT1 to the physical layer 400 in an unused state and increases the AWT value of an open address frame OAF to give higher priority to the open address frame (connection request) of the target 1 in the physical layer 400 having the open sequence time OST other than the minimum so that the possibility that the physical layer 400 having the open sequence time OST other than the minimum acquires the right to transmit data is increased.

If an interface control circuit $500_0$ uses, among first and second physical layers in a wide port PU, a second physical layer $400_1$ at a timing between the start of measurement of an open sequence time and after the measurement, the connection control circuit 502 controls the connection between an interface control circuit $500_1$ and a physical layer $400_0$ so that the interface control circuit $500_1$ is connected to the unused physical layer $400_0$.

In addition, the connection control circuit 502 outputs the control signal CNT1 to the physical layer $400_0$ (or the interface control circuit) to adjust the AWT value of the open address frame of the physical layer 400 so that the physical layer $400_0$ is more likely to be used (selected) in response to a data transfer request from the host/initiator 6, 60. For example, the possibility that the physical layer $400_0$ acquires the transmission right of data based on the SAS standard is increased by making the AWT value of the physical layer $400_0$ larger than the AWT value of the other physical layer $400_1$.

Incidentally, the AWT value of each of the physical layers 400 may be adjusted by judging operating conditions of the physical layer 400 before starting an open sequence time, for example, before the open sequence time is determined, such as when a data transfer request is received from the host/initiator 6, 60 or such as during transmission of the open address frame.

As described above, the possibility that the unused physical layer having the maximum AWT among a plurality of physical layers is selected for data transfer is increased.

Thus, by improving the efficiency of using the physical layer, data can be efficiently read from a data buffer in FIFO mode and a stacked state of the data buffer can be reduced.

Therefore, according to a storage device in the second embodiment, the data transfer efficiency can be improved.

(3) Third Embodiment

A storage device in a third embodiment will be described with reference to FIGS. 9 to 11. In the third embodiment, the description of members having substantially the same configuration and function as those described in a storage device in the first or second embodiment is omitted.

(a) Configuration Example

In a storage device (for example, SAS-SSD) in the SAS standard to which a wide port/wide link is applied in the above embodiments, a physical layer (transmission path) 400 in which data transfer is less likely to stagnate (the time before data transfer is started is short or the open sequence time is minimum) based on a comparison result of the period until data transfer is ready to be started after the data transfer in each physical layer is requested. Then, in the storage device in the above embodiments, the data transfer is controlled by using the physical layer 400 so that stagnation (stacked state of the read buffer) of data output from the data buffer should not arise.

However, in data transfer between a storage device (target) and a host (initiator) in the SAS standard, the stagnation of data transfer may arise due to a factor on the initiator side. Therefore, there are some cases when it is difficult for a storage device 1 as a target to completely predict the stagnation of data transfer between the target and initiator.

The configuration and operation to achieve improved efficiency in data transfer by detecting stagnation of data transfer caused by an initiator in a storage device in the third embodiment will be described by using FIGS. 9 to 11. FIG. 9 is a diagram showing an example of the internal configuration of the storage device 1 in the third embodiment. FIG. 10 is a flow chart showing an operation example of the storage device 1 in the third embodiment. FIG. 11 is a diagram schematically showing the operation of the storage device 1 in the third embodiment.

Figure 9:
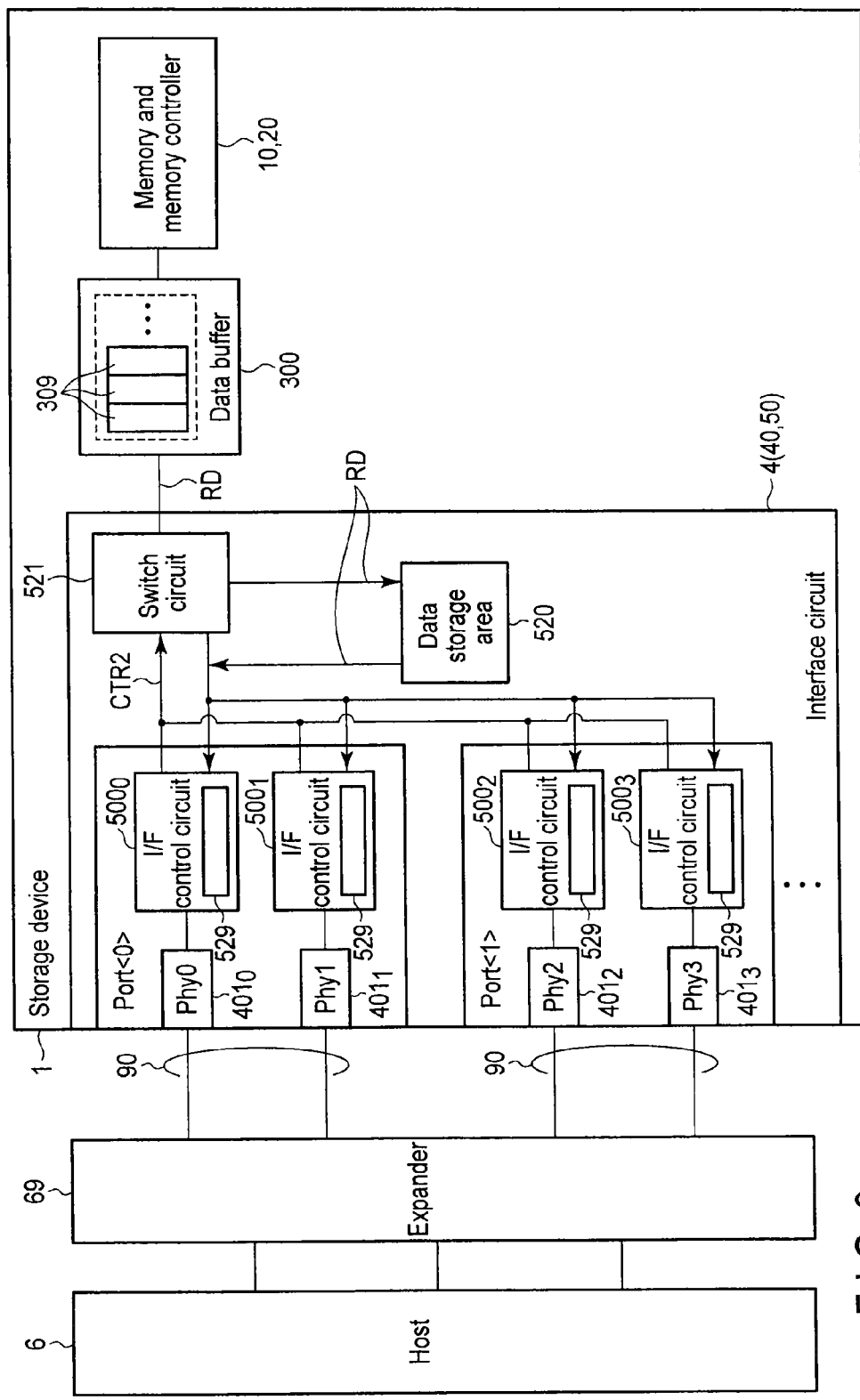
FIG. 9 is a schematic diagram of an internal configuration example of a storage device in a third embodiment.

As shown in FIG. 9, the storage device 1 in the present embodiment is connected to a host 6 via, for example, an expander 69.

For example, the storage device 1 in the present embodiment includes a storage area 520 for temporarily holding data from a data buffer (read buffer) 300 in, for example, an interface circuit 4.

When the possibility of stagnation of data transfer caused by the host 6 (initiator) is detected, the storage device 1 in the present embodiment transfers data corresponding to a command from the initiator that may cause stagnation of data transfer from the data buffer 300 to the storage area 520.

Accordingly, data of the data buffer 300 that outputs data in a predetermined order (here, the FIFO mode) is temporarily saved from inside the data buffer 300. The data saved in the storage area 520 (hereinafter, also called the saved data) is output onto the transmission path (data path) connected to the physical layer 400 from the storage area 520 at a predetermined timing under the control of an interface controller 50.

In the present embodiment, the storage area where data in the data buffer 300 is temporarily saved is called a data save area (or a data storage area or reserved area) 529.

The data save area 520 is provided in the interface circuit 4 so as to be shared by each of the physical layers 400 and an interface control circuit 500 corresponding to each of the physical layers 400. The data save area 520 may be provided in a RAM 30. The data save area 520 may also be provided for each wide port provided in an interface 40.

Incidentally, the buffer 529 provided in the interface control circuit 500 corresponding to each of the physical layers 400 may be used as the data save area. When the data save area is the buffer 529 provided in each of the interface control circuits 500, save processing of data can be performed for each of the physical layers 400. As a result, read control from the data save area when data in the data buffer 300 is saved can be simplified.

The data save area 520 may include a plurality of storage areas (buffers) so that a plurality of pieces of data from the read buffer can be stored.

The storage device 1 in the present embodiment includes a switch circuit 521 in the interface circuit 4.

In the present embodiment, the interface control circuit 500 detects the state of use of the physical layer 400. A signal indicating use or non-use of the physical layer 400 as a detection result of the interface control circuit 500 is input into the switch circuit 521 as a control signal CNT2.

Based on the control signal CNT2 indicating the state of use of the physical layer 400 detected by the interface control circuit 500, the switch circuit 521 switches connection of the data buffer 300 to the interface control circuit 500 and the physical layer 400 or the data save area 520. Hereinafter, the state in which the physical layer 400 is used by the host (initiator) 6 is called a port closed state.

When the physical layer 400 is in use (port closed state), the physical layer 400 in the port closed state cannot be used for data transfer in response to a data transfer request, which increases the possibility that stagnation of data transfer may arise.

In the present embodiment, by detecting the possibility that stagnation of the data transfer (port closed state of the physical layer 400) caused by the host/initiator 6 may arise, the output of data from the data buffer 300, more specifically, the transfer of data in the data buffer 300 to the physical layer 400 and the transfer of data in the data buffer 300 to the other storage area (data save area) 520 are controlled by using the data save area 520 and the switch circuit 521.

Therefore, by temporarily saving data that may be output from a physical layer in the port closed state in another storage area from inside the data buffer 300, stagnation of output of data in the data buffer 300 can be reduced.

As a result, according to a storage device in the present embodiment, the transfer efficiency of data can be improved.

(b) Operation

The operation of a storage device in the present embodiment will be described by using FIG. 10. A case when the first data RD<0> in the output order inside the read buffer 300 in FIFO mode is transferred from the physical layer 400 will be described.

As shown in FIG. 10, a data transfer request is transmitted from the host/initiator 6, 60 to the target (step ST20).

The interface control circuit 500 monitors/checks port closed states of the physical layer 400 and examines transmitting/receiving states (operating conditions of the physical layer) of data of the physical layer 400 of the target 1 (step ST21). Whether the physical layer is in the port closed state is thereby determined (step ST22). The physical layer 400 in an error or the normal physical layer 400 transferring data is detected as a physical layer in a port closed state.

If the physical layer 400 in a port closed state is detected, the control signal CNT2 indicating the port closed state is output from the interface control circuit 500 to the switch circuit 521 (step ST22).

The read buffer 300 in FIFO mode is connected to the data save area 520 by the switch circuit 521 into which the control signal CNT2 indicating the port closed state has been input.

The data (first output data) RD<0> to be transmitted from the physical layer 400 for which the port closed condition is met is saved in the data save area 520 under the control of the interface control circuit 500 and the switch circuit 521 (step ST23A).

Figure 11:
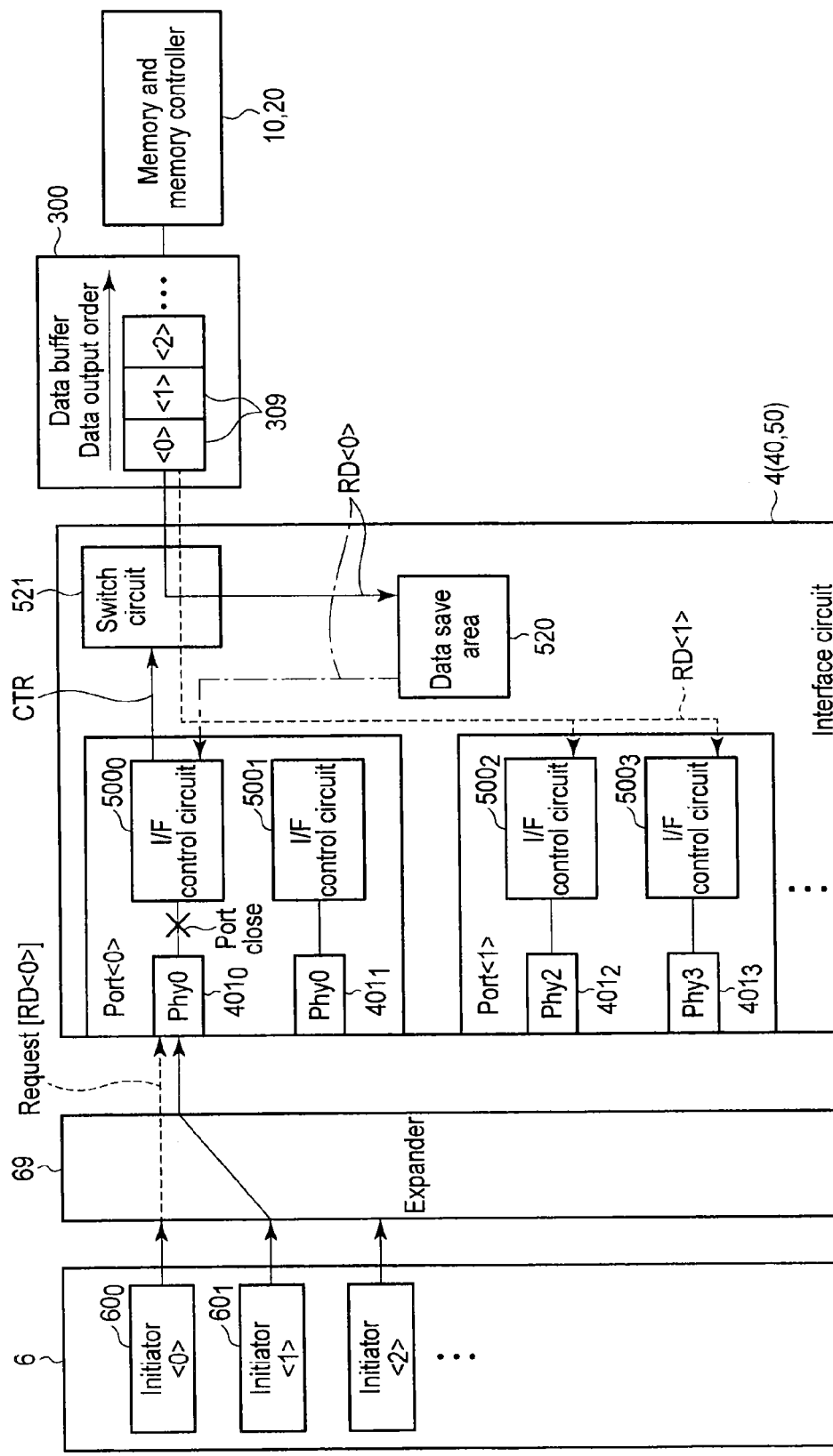
FIG. 11 is a diagram illustrating an operation example of the storage device in the third embodiment.

Accordingly, as shown in FIG. 11, the transmission path of data is opened from the data buffer 300 to another interface control circuit/physical layer (and the initiator) so that, prior to the first data RD<0>, the data (second data) RD<1> in the output order subsequent to the saved data RD<0> can be output from the data buffer 300 to another port, for example, interface control circuits 500$_2$, 500$_3$ and physical layers 400$_2$, 400$_3$ of the second port. A transfer sequence (for example, the sequence in steps ST10 to ST17 of FIG. 7) for data RD2 that can be output onto the transmission path is then executed.

When the port closed state of the physical layer 400 is terminated, a control signal indicating the termination of the port closed state of the physical layer 400 is transmitted from the interface control circuit 500 to the switch circuit 521.

When the port closed state of the physical layer 400 is terminated, data stored in the data save area 520 is output from inside the data save area 520 to the interface control circuit 500 and the physical layer 400 under the control of the interface control circuit 500 and the switch circuit 521 (step ST25). The data output from the data save area 520 is transmitted from the interface control circuit 500 and the physical layer 400 to the host/initiator 6, 60 that has issued the data transfer request (step ST26).

Depending on operation conditions of other physical layers/ports, the data (saved data) stored in the data storage area 520 is transmitted to the initiator 60 via the physical layer (here, the physical layer Phy0) whose port closed state has been terminated at a timing after the second data RD<1> and subsequent data in FIFO mode are output from the read buffer 300 to the host 6 via the predetermined physical layer 400. If the port closed state of the physical layer 400 is terminated at a timing after the second data RD<1> and subsequent data being output from the read buffer 300 and before being transmitted from the physical layer 400 to the host 6, data stored in the data save area 520 may be output from the physical layer (Phy0) 400 whose port closed state has been terminated to the predetermined initiator 60. Incidentally, before the second data RD<1> and subsequent data are read from the read buffer 300, the data RD<0> in the data save area 520 may be output to the physical layer 400 whose port closed state has been terminated. Further, when the interface 40 of the storage device 1 is controlled by a wide port, if the other physical layer 400 belonging to the common wide port is available (unused), the data in the data save area 520 may be transferred from the available physical layer 400 to the predetermined initiator.

If, in step ST22 in FIG. 10, the physical layer 400 is determined to be not in a port closed state, the interface control circuit 500 is connected to the read buffer 300 by the switch circuit based on the control signal CNT2 from the interface control circuit 500. The data from the read buffer 300 is output directly to the interface control circuit 500 without going through the data save area 520 (step ST23B).

For example, in step ST23B in FIG. 10, the data input into the interface control circuit 500 is output to the predetermined physical layer 400 or the physical layer determined to have the minimum open sequence time by the processing in steps ST10 to ST17 in FIG. 7. Then, the data is transmitted to the initiator (step ST26).

Also, regarding the output of data from the read buffer 300 subsequent to the saved data, the output of data from the read buffer 300 is done after whether the physical layer is in a port closed state is determined and whether to save data in accordance with the determination result is determined as described above.

Thus, when the physical layer (and the port) to which a request of data transfer is made is in a port closed state, data to be output from the physical layer in the port closed state is temporarily saved in another storage area (data save area) from the data buffer. Accordingly, data to be output from the data buffer after the saved data can be output onto the transmission path. Accordingly, stagnation of data output from the data buffer caused by a port closed state of the physical layer can be reduced.

If, as described above, the situation in which physical layer 400 that cannot be used arises due to a port closed state, the efficiency in data transfer can be improved by temporarily saving data to be transmitted from the physical layer.

(c) Concrete Examples of Port Closed State Conditions

Concrete examples of port closed states of the physical layer will be described below.

As port closed states for the I/F control circuit 500 to detect a port closed state of the physical layer 400, "Opened by destination" or "CREDIT_BLOCKED Received" is used. However, other signals indicating a port closed state or a state in which data transfer cannot be performed may also be used to detect a port closed state.

<Opened by Destination>

When data is transmitted from a target to an initiator in "Opened by destination" as a port closed state, a target (physical layer/port) may be connected to an initiator other than the initiator having requested data transmission. In this case, a target connected to the other initiator is recognized by the interface control circuit as being in a port closed state.

As an example, data transfer from a first physical layer (Phy0) 400$_0$ of a first port PU<0> will be described. For example, the physical layer (Phy0) 400$_0$ is requested to transfer data from a first initiator 60$_0$ while receiving data from a second initiator 60$_1$.

In step ST21 in FIG. 10, an interface control circuit 500$_0$ corresponding to the first physical layer 400$_0$ detects that the physical layer (Phy0) 400$_0$ is receiving data. Because the physical layer 400$_0$ is receiving data, the interface control circuit 500$_0$ recognizes that data cannot be currently transmitted from the physical layer (Phy0) 400$_0$.

In steps ST22 and ST23 in FIG. 10, based on the detection result, the interface control circuit 500$_0$ notifies the switch circuit 521 that the physical layer (Phy0) 400$_0$ is in a port closed state by transmitting the control signal CNT2.

Then, in step ST24 in FIG. 10, based on the control signal CNT2 (port closed state detection result) from the interface control circuit 500$_0$, the switch circuit 521 switches the connection between the data buffer 300 and the transmission path (interface control circuit) and connects the data buffer 300 to the data save area 520. Data (first data in the output order) of the data buffer 300 output in FIFO mode is temporarily stored in the data storage area 520 under the control of the interface control circuit 500 and the switch circuit 521 (or at a predetermined timing).

Then, when data transfer from the initiator 60$_1$ to the physical layer 400$_0$ is completed and data is ready for transmission from the physical layer 400$_0$ to the initiator 60$_0$ in response to a data transfer request, the port closed state of the physical layer $400_0$ by "Opened by destination" is terminated. The physical layer $400_0$ is connected to the initiator $60_0$ by an open sequence under the control of the interface control circuit $500_0$.

In step ST24 in FIG. 10, the data saved in the data save area 520 is output from the data save area 520 to the physical layer 400 under the control of the interface control circuit $500_0$ and the switch circuit 521. Then, data is transmitted from the physical layer $400_0$ to the initiator $60_0$ based on a data transfer request from the host 6 (step ST26).

<Reception of CREDIT_BLOCKED>

If the physical layer 400 receives "CREDIT_BLOCKED" as a control signal when transmitting data to the initiator 60, the physical layer 400 is caused to be in a port closed state. "CREDIT_BLOCKED" is a control signal (primitive) that notifies the port/physical layer of the target 1 that no data transmission credit is granted.

Even if the physical layer 400 of the target 1 is connected to the initiator 60 having requested data transfer, the target 1 cannot transmit data to the initiator 60 if the physical layer 400 has not received a signal (for example, the data transmission credit "RRDY") permitting transmission of data from the initiator 60.

If, for example, the host/initiator 6, 60 cannot receive data from the target 1, the initiator 60 transmits "CREDIT_BLOCKED" to a predetermined port/physical layer of the target 1. By transmitting "CREDIT_BLOCKED" to the target, the host/initiator 6, 60 blocks transmission of data from the target 1 without giving a data transmission credit to the target 1.

Data in the data buffer 300 to be output from the physical layer 400 having received "CREDIT_BLOCKED" is output from the data buffer 300 to the data save area 520 due to a notification of a port closed state from the physical layer/interface control circuit 400, 500 and switching of the transmission path by the switch circuit 521. Accordingly, the second data and subsequent data in the read buffer 300 can be output from the read buffer 300.

After the latest connection (currently being processed) between the physical layer 400 having received "CREDIT_BROCKED" and the initiator is terminated, an open sequence of the physical layer (wide port) on the initiator having transmitted a data transfer request and "CREDIT_BROCKED" is re-executed under the control of the interface controller 50 (interface control circuit 500). Then, the physical layer 400 attempts to acquire the data transmission credit "RRDY" from the initiator.

If the physical layer 400 is caused to be in a port closed state by reception of "CREDIT_BROCKED", the port closed state of the physical layer 400 is terminated by the data transmission credit "RRDY" being received (acquired) by the physical layer 400.

After the port closed state is terminated by "CREDIT_BROCKED" as in the above operation, data in the data save area 520 is transmitted from the physical layer 400 whose the port closed state is terminated to the predetermined initiator 60 by a control signal indicating the termination of the port closed state.

According to a storage device in the third embodiment and the operation thereof, as described above, improved efficiency in data transfer can be achieved.

(3) Modification Examples and Application Examples

Application examples of storage devices in the first to third embodiments will be described with reference to FIGS. 12 to 15.

FIG. 12 illustrates a modification example of a storage device (and a storage system) in an embodiment. FIG. 12 is a block diagram illustrating a modification example.

For example, a transmission path of signals is formed by the physical layer of a host (initiator) and the physical layer of a storage device (target) being brought into direct contact (mechanically connected). The transfer of data between the host and the storage device is thereby performed.

However, as shown in FIG. 12, the transfer of data between a host/initiator 6, 60 and a storage device 1 may be performed by wireless communication 99. In this case, the interface (physical layer) of the host 6 and an interface (physical layer) 400 of the storage device 1 are not directly in contact. The physical layer of the host 6 and the physical layer 400 of the storage device 1 are configured so that data transfer by the wireless communication 99 (non-contact data transfer) can be performed.

Figure 13:
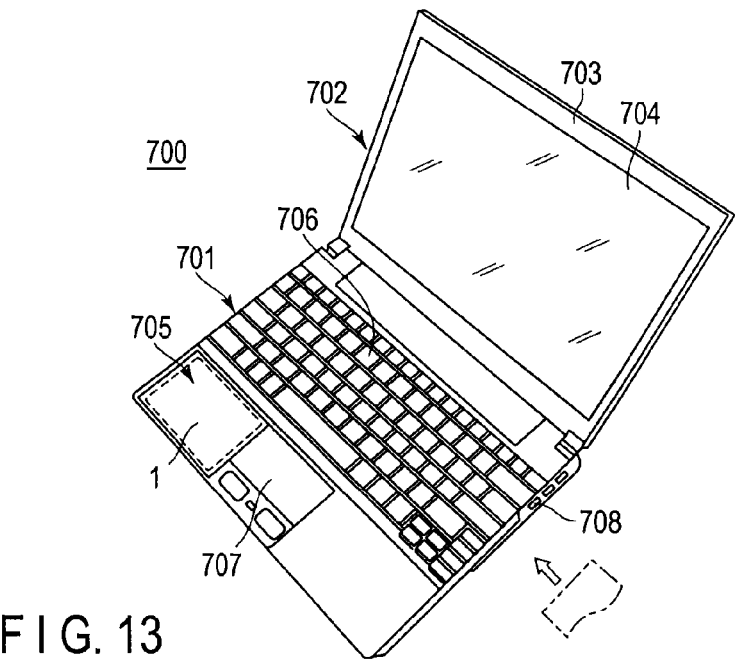
FIG. 13 is a diagram showing an application example of the storage device in the embodiment.
Figure 14:
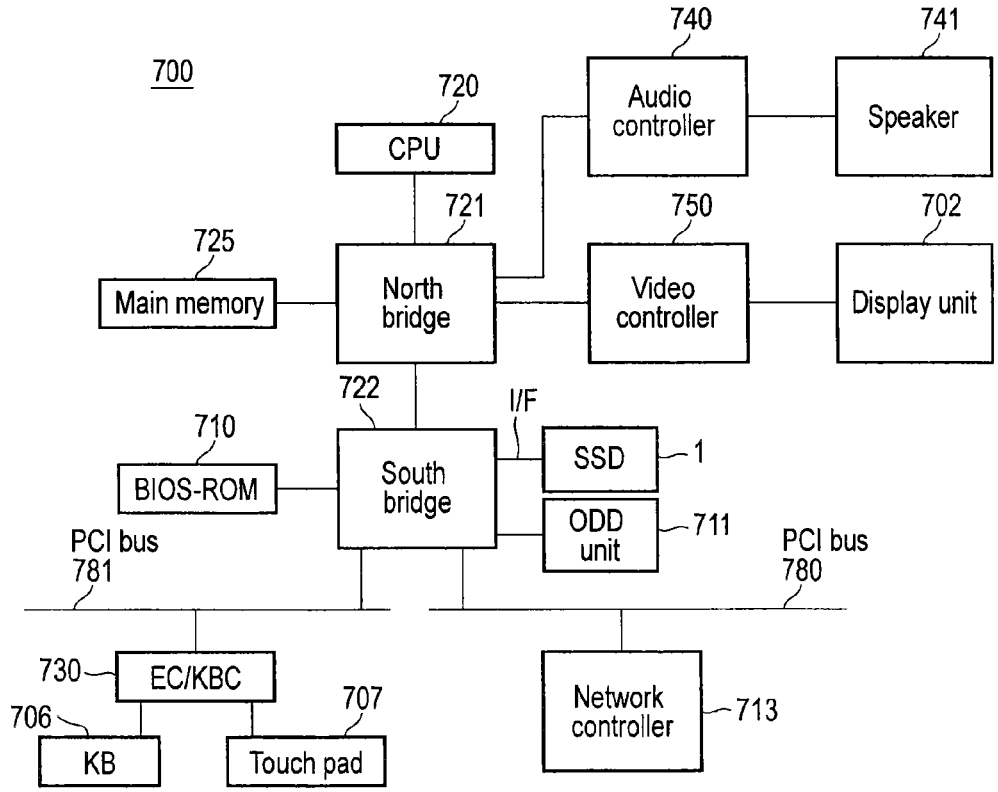
FIG. 14 is a diagram showing an application example of the storage device in the embodiment.

FIGS. 13 to 15 are schematic diagrams showing some application examples of the storage device (storage system) in the embodiment.

FIG. 13 is a perspective view showing an example of a personal computer mounted with the storage device (for example, SAS-SSD) 1 in the embodiment.

As shown in FIG. 13, a personal computer 700 includes a main body 701 and a display unit 702. The display unit 702 includes a display housing 703 and a display apparatus 704 accommodated in the display housing 703.

The main body 701 includes a cabinet 705, a keyboard 706, and a touch pad 707 as a pointing device. A main circuit board, an optical disk device (ODD) unit, a card slot, and an SSD 1 are accommodated in the cabinet 705.

The card slot is provided abutting on a peripheral wall of the cabinet 705. An opening 708 opposed to the card slot is provided in the peripheral wall. An additional device can be inserted into or removed from the card slot from outside the cabinet 705 by the user through the opening 708.

The SSD 1 may be used as a replacement of a conventional hard disk drive (HDD) by being mounted inside the personal computer 700 or as an additional device by being inserted into the card slot of the personal computer 700.

FIG. 14 is a block diagram showing a configuration example of the personal computer mounted with an SSD in the embodiment.

As shown in FIG. 14, the personal computer 700 includes a CPU 720, a north bridge 721, a main memory 725, a video controller 750, an audio controller 740, a south bridge 722, a BIOS-ROM 710, the SSD 1, an ODD unit 711, an embedded controller/keyboard controller (EC/KBC) 730, and a network controller 706.

The CPU 720 is a processor provided to control the operation of the personal computer 700. The CPU 720 executes an operating system (OS) loaded from the SSD 1 into the main memory 725. Further, if the ODD unit 711 enables at least one of read processing and write processing on an inserted optical disk, the CPU 720 also performs such processing.

The CPU 720 also executes a Basic Input Output System (BIOS) stored in the BIOS-ROM 710. The BIOS is a program to control hardware in the personal computer 700.

The north bridge 721 is a bridge device to connect a local bus of the CPU 720 to the south bridge 722. The north bridge 721 includes a memory controller to control access of the main memory 725.

The north bridge 721 also has a function to perform communication with the video controller 750 via an Accelerated Graphics Port (AGP) bus and communication with the audio controller 740.

The main memory 725 temporarily stores programs or data and functions as a work area of the CPU 720. The main memory 725 is constituted of, for example, a RAM.

The video controller 750 is a video reproduction controller that controls the display unit 702 used as a display monitor of the personal computer 700.

The audio controller 740 is an audio reproduction controller that controls a speaker 741 of the personal computer 700.

The south bridge 722 controls each device on a Low Pin Count (LPC) bus 781 and each device on a Peripheral Component Interconnect (PCI) bus 780. The south bridge 722 also controls the SSD 1 as a storage apparatus storing various kinds of software and data via an SAS interface.

The personal computer 700 accesses the SSD 1 in units of sectors. A write command, a read command, a cache flash command and the like are input into the SSD 1 via the SAS interface.

The south bridge 722 also has a function to control access of the BIOS-ROM 710 and the ODD unit 711.

The EC/KBC 730 is a 1-chip microcomputer in which an embedded controller for power management and a keyboard controller to control the keyboard (KB) 706 and the touch pad 707 are integrated.

The EC/KBC 730 has a function to turn on/off the power supply of the personal computer 700 in accordance with an operation of a power button by the user. A network controller 713 is a communication apparatus that performs communication with an external network, for example, the Internet or the like.

The configuration and operation of the SSD 1 applied to a computer are the same as those in the above embodiments.

FIG. 15 is a conceptual diagram showing an application example of a server mounted with an SSD in the embodiment.

As shown in FIG. 15, a server 800 is connected to an Internet 801. The server 800 is mounted with the SSD 1 in the embodiment. Further, a terminal, for example, a computer 802 is connected to the Internet (for example, a network by cloud computing) 801. The user accesses the SSD 1 on the server 800 from the computer 802 via the Internet 801.

The configuration and operation of the SSD 1 applied to a server are the same as those in the above embodiments.

With a storage device in the embodiment being applied to a personal computer or a server, the data transfer efficiency of the personal computer or the server can be improved.

[Others]

The storage device in the present embodiment may be an HDD (Hard Disk Drive). When the storage device is an HDD, a magnetic disk is used instead of a flash memory (semiconductor memory) and an HDD controller is used instead of a memory controller.

Incidentally, if, as described in the first to third embodiments, one physical layer (transmission path of data/signals) used for data transfer can be selected from a plurality of physical layers based on a period until data is ready for transmission after data transfer is requested, an interface circuit (an interface and an interface controller) of the storage device described in the embodiment can be provided as an apparatus (for example, a chip or board) independently of the apparatus in which a memory is provided.

In the above embodiments, a storage device in which a plurality of physical layers is provided in one port is illustrated. However, the operation described in the embodiment may be performed in a storage device in which one physical layer is provided in one port to achieve improved efficiency in data transfer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
    a first memory that stores data;
    an interface that includes a plurality of first physical layers and connects a host and the first memory;
    a second memory that temporarily stores the data transferred between the host and the first memory via the interface; and
    a controller that controls operations of the first and second memories and the interface,
    wherein
    when the data is transferred from the first memory to the host based on a data transfer request from the host,
    the controller reads the data in the first memory corresponding to the data transfer request into the second memory, and
    the controller selects a physical layer among the physical layers to transfer the data corresponding to the data transfer request from the host, from the second memory to the host based on a first period, the first period being a period from receipt of the data transfer request to receipt of a signal from the host indicating that the host is ready for receiving the data.

2. The storage device according to claim 1, wherein the controller measures the first period in each of the physical layers and selects, among the physical layers, the physical layer having the minimum first period based on comparison results of a plurality of the measured first periods.

3. The storage device according to claim 1, wherein the second memory outputs the data from the first memory to the physical layer in a first-in first-out mode.

4. The storage device according to claim 3, wherein the second memory is an SRAM.

5. The storage device according to claim 1, wherein the data transfer between the physical layer and the host is performed based on an SAS standard.

6. The storage device according to claim 1, wherein the controller includes a plurality of physical layer control circuits and
    a one-to-one correspondence is formed between the physical layer and the physical layer control circuit and the physical layer control circuit controls the operation of the respective physical layer.

7. The storage device according to claim 6, wherein each of the physical layer control circuits includes a timer to measure the first period and
    the controller compares measured values of each of the timers to select the physical layer having the minimum first period from among the physical layers.

8. The storage device according to claim 7, wherein when the physical layer having the minimum first period is in a closed state,
    the controller gives higher priority of the data transfer of the one physical layer belonging to a transmission path common to the physical layer having the minimum first period than the priority of the data transfer of the other physical layers.

9. The storage device according to claim 8, wherein
the controller changes the priority of the data transfer of the physical layer by adjusting a size of a second period until connection between the host and the physical layer is established after the receipt of the data transfer request in each of the physical layers.

10. The storage device according to claim 9, wherein
the second period is an ARBITRATION WAIT TIME in an SAS standard.

11. The storage device according to claim 1, wherein
the controller includes
at least a data storage area that temporarily stores the data from the second memory and
a switch circuit that switches connection of the second memory, the physical layers, and the data storage area based on data transfer conditions between the host and the each of the physical layers, wherein
the controller controls input/output of the data between the second memory and the data storage area based on conditions of the data transfer of each of the physical layers.

12. The storage device according to claim 11, wherein
the controller includes a plurality of the data storage areas,
the controller includes a plurality of physical layer control circuits,
a one-to-one correspondence is formed between the physical layer and the physical layer control circuit and the physical layer control circuit controls the operation of the respective physical layer, and
the data storage area is provided for each of the physical layer control circuits.

13. The storage device according to claim 11, wherein
the controller detects conditions of the data transfer between the host and each of the physical layers based on at least one of a signal indicating operating conditions of the physical layer and a signal indicating the physical layer in which the data transfer to the host is blocked.

14. The storage device according to claim 11, wherein
when a first data transfer request and a second data transfer request subsequent to the first data transfer request are issued from the host and the physical layer corresponding to the first data transfer request is detected being in use based on a signal indicating operating conditions of the physical layer,
the physical layer in use is separated from the second memory by the switch circuit and the data corresponding to the first data transfer request is output by the switch circuit from the second memory to the data storage area.

15. The storage device according to claim 11, wherein
when a signal indicating the physical layer in which data transmission to the host is blocked is issued by the host,
the physical layer in which the data transmission is blocked is separated from the second memory by the switch circuit and the data corresponding to the physical layer in which the data transmission is blocked is output by the switch circuit from the second memory to the data storage area.

16. The storage device according to claim 1, wherein
the controller controls the interface by using a plurality of first control units, each of the first control unit including the physical layers of a first number of 2 or more, and
the two physical layers or more in the common first control unit function as a common transmission path to the host.

17. A storage system comprising:
a controller that, when data is transferred from a first memory to a host, selects a transmission path capable of performing data transfer from among a plurality of the transmission paths based on a first period in each of the transmission paths and controls the data transfer between the first memory and the host,
wherein
the first period is a period from receipt of a request of the data transfer from the host to receipt of a signal from the host indicating that the host is ready for receiving the data,
the data from the first memory is input into a second memory that outputs the data in a first-in first-out mode and output from the second memory to the selected transmission path, and
the data transfer is performed between a physical layer and the host.

18. The storage system according to claim 17, wherein
the controller selects the transmission path to transfer the data corresponding to the request of the data transfer, from the second memory to the host based on the first period in each of the transmission paths.

19. The storage system according to claim 17, wherein
the controller temporarily stores the data in the second memory in a data storage area inside the controller based on conditions of the data transfer between the transmission path and the host.

* * * * *